US012493959B2

(12) United States Patent
Numasaki et al.

(10) Patent No.: US 12,493,959 B2
(45) Date of Patent: Dec. 9, 2025

(54) IMAGE ANALYSIS METHOD, IMAGE ANALYSIS DEVICE, IMAGE ANALYSIS SYSTEM, CONTROL PROGRAM, AND RECORDING MEDIUM

(71) Applicant: OSAKA UNIVERSITY, Osaka (JP)

(72) Inventors: Hodaka Numasaki, Osaka (JP); Shoichi Tomohisa, Osaka (JP); Masahiko Koizumi, Osaka (JP); Hirofumi Yamamoto, Osaka (JP); Kazuaki Nakane, Osaka (JP); Noriyuki Tomiyama, Osaka (JP); Masahiro Yanagawa, Osaka (JP); Osamu Honda, Osaka (JP)

(73) Assignee: Osaka University, Osaka (JP)

( * ) Notice: Subject to any disclaimer, the term of this patent is extended or adjusted under 35 U.S.C. 154(b) by 814 days.

(21) Appl. No.: 17/782,080

(22) PCT Filed: Dec. 4, 2020

(86) PCT No.: PCT/JP2020/045155
§ 371 (c)(1),
(2) Date: Jun. 2, 2022

(87) PCT Pub. No.: WO2021/112205
PCT Pub. Date: Jun. 10, 2021

(65) Prior Publication Data
US 2023/0005148 A1 Jan. 5, 2023

(30) Foreign Application Priority Data
Dec. 5, 2019 (JP) .................................. 2019-220455

(51) Int. Cl.
G06V 10/62 (2022.01)
A61B 6/03 (2006.01)
(Continued)

(52) U.S. Cl.
CPC .............. *G06T 7/0014* (2013.01); *G06T 7/11* (2017.01); *G06T 2207/30024* (2013.01)

(58) Field of Classification Search
None
See application file for complete search history.

(56) References Cited

U.S. PATENT DOCUMENTS

2002/0191823 A1* 12/2002 Wehrli .................. A61B 5/055
600/407
2011/0274340 A1* 11/2011 Suzuki ................ G06V 20/698
382/133

(Continued)

FOREIGN PATENT DOCUMENTS

JP 20040416174 A 2/2004
JP 2015156894 A 9/2015

(Continued)

OTHER PUBLICATIONS

International Search Report, and English Translation thereof, for International Application No. PCT/JP2020/045155, mailed Feb. 22, 2021, (7 pages).

(Continued)

Primary Examiner — Mohammed Rachedine
(74) Attorney, Agent, or Firm — Kagan Binder, PLLC

(57) ABSTRACT

The disclosed feature makes it possible to accurately determine a change that has occurred in a tissue. The feature includes: a binarizing section (41) that generates, from an image to be analyzed, a plurality of binarized images having respective binarization reference values different from each other; a Betti number calculating section (42) that calculates, for each of the plurality of binarized images, a one-dimensional Betti number indicating the number of hole-shaped regions each of which is surrounded by pixels each having a first pixel value obtained by binarization and is constituted by pixels each having a second pixel value obtained by (Continued)

binarization; and a determining section (44) that determines a change that has occurred in the tissue, based on a binarization reference value and a one-dimensional Betti number in a binarized image in which the one-dimensional Betti number is maximized.

12 Claims, 18 Drawing Sheets

(51) Int. Cl.
  *G06T 7/00* (2017.01)
  *G06T 7/11* (2017.01)
  *G06T 7/136* (2017.01)
  *G06V 10/25* (2022.01)
  *G06V 10/75* (2022.01)
  *G06V 10/82* (2022.01)

(56) References Cited

U.S. PATENT DOCUMENTS

| | | | | |
|---|---|---|---|---|
| 2018/0204324 A1 | * | 7/2018 | Kawaguchi | G01N 33/48 |
| 2018/0293465 A1 | | 10/2018 | Kanada | |
| 2019/0377976 A1 | * | 12/2019 | Markram | G06V 10/764 |

FOREIGN PATENT DOCUMENTS

| | | | | | |
|---|---|---|---|---|---|
| JP | 2018175226 A | | 11/2018 | | |
| WO | WO-2010087112 A1 | * | 8/2010 | | G06T 7/62 |
| WO | WO-2011030756 A1 | * | 3/2011 | | G06T 7/174 |
| WO | WO-2017010397 A1 | * | 1/2017 | | G06T 1/00 |
| WO | 2019102829 A1 | | 5/2019 | | |
| WO | 2020067481 A1 | | 4/2020 | | |
| WO | 2020195258 A1 | | 10/2020 | | |
| WO | 2020241178 A1 | | 12/2020 | | |

OTHER PUBLICATIONS

International Preliminary Report on Patentability, and English Translation thereof, for International Application No. PCT/JP2020/045155, mailed May 17, 2022, (7 pages).
E-Space English Abstract and J-PlatPat Machine Translation for JP 2015156894 A.
E-Space English Abstract and machine translation for JP 2018175226 A.
E-Space English Abstract for WO 2010087112 A1.
E-Space English Abstract and machine translation for WO 2017010397 A1.
E-Space English Abstract and machine translation for WO 2020067481 A1.
E-Space English Abstract and machine translation for WO 2020195258 A1.
E-Space English Abstract and machine translation for WO 2020241178 A1.
E-Space English Abstract and machine translation for JP 20040416174 A.
E-Space English Abstract and machine translation for WO 2019102829 A1.

* cited by examiner b0=1
b1=1 b0=2
b1=3

| FIRST REFERENCE VALUE Ta | MAXIMUM ONE-DIMENSIONAL BETTI NUMBER Va | DETERMINATION RESULT |
|---|---|---|
| 70~100 | 10~25 | LUNG FIELD (WITHOUT NODULE) |
| 120~180 | 2~10 | GROUND-GLASS NODULE |
| 180~255 | 2~10 | PULMONARY VESSEL |
| 180~255 | 10~50 | SOLID NODULE |
| ... | ... | ... |

| FIRST REFERENCE VALUE Ta | MAXIMUM ONE-DIMENSIONAL BETTI NUMBER Va | SECOND REFERENCE VALUE Tb | MAXIMUM ZERO-DIMENSIONAL BETTI NUMBER Vb | DETERMINATION RESULT |
|---|---|---|---|---|
| 70~100 | 10~25 | 60~80 | 15~30 | LUNG FIELD (WITHOUT NODULE) |
| 120~180 | 2~10 | 80~130 | 7~15 | GROUND-GLASS NODULE |
| 180~255 | 2~10 | 130~180 | 4~8 | PULMONARY VESSEL |
| 180~255 | 10~50 | 150~255 | 10~20 | SOLID NODULE |
| ... | ... | ... | ... | ... |

FIG. 26

| THIRD REFERENCE VALUE Tc | MAXIMUM VALUE R OF b1/b0 | FIRST REFERENCE VALUE Ta | MAXIMUM ONE-DIMENSIONAL BETTI NUMBER Va/W | SECOND REFERENCE VALUE Tb | MAXIMUM ZERO-DIMENSIONAL BETTI NUMBER Vb/W | DETERMINATION RESULT |
|---|---|---|---|---|---|---|
| 0~25 | 5~15 | 0~30 | 0.2~0.4 | 0~20 | 0.3~0.5 | LUNG FIELD (WITHOUT NODULE) |
| 125~150 | 5~15 | 120~150 | 0.15~0.3 | 25~50 | 0.2~0.35 | PULMONARY VESSEL |
| 125~150 | 20~40 | 120~150 | 0.08~0.2 | 30~50 | 0.08~0.15 | SOLID NODULE |
| 125~150 | 40~60 | 35~150 | 0.03~0.1 | 15~40 | 0.05~0.15 | MIXED NODULE |
| 50~100 | 8~20 | 40~70 | 0.05~0.1 | 20~40 | 0.1~0.2 | GROUND-GLASS NODULE |
| ... | ... | ... | ... | ... | ... | ... |

IMAGE ANALYSIS METHOD, IMAGE ANALYSIS DEVICE, IMAGE ANALYSIS SYSTEM, CONTROL PROGRAM, AND RECORDING MEDIUM

CROSS-REFERENCE TO RELATED APPLICATIONS

This application claims priority to International Application No. PCT/JP2020/045155, filed Dec. 4, 2020 and titled "IMAGE ANALYSIS METHOD, IMAGE ANALYSIS DEVICE, IMAGE ANALYSIS SYSTEM, CONTROL PROGRAM, AND RECORDING MEDIUM," which in turn claims priority from a Japanese Patent Application having serial number 2019-220455 filed Dec. 5, 2019, both of which are incorporated herein by reference in their entireties.

TECHNICAL FIELD

The present invention relates to an image analyzing method, an image analyzing device, and the like, each of which is for analyzing a captured image of a tissue and determining a change that has occurred in the tissue.

BACKGROUND ART

The number of people undergoing chest screening is increasing year by year, and the burden on doctors who interpret medical images such as a chest CT image is accordingly increasing year by year. In order to reduce the burden on the doctors, an image analysis technique by a computer is indispensable.

In recent years, many image analysis (image recognition) technologies based on artificial intelligence such as deep learning have been attempted, and some of the technologies have been reported to be capable of outputting determination results equivalent to those by doctors. For example, Patent Literatures 1 and 2 disclose image analysis techniques for medical images.

CITATION LIST

Patent Literature

[Patent Literature 1]
  Japanese Patent Application Publication Tokukai No. 2018-175226
[Patent Literature 2]
  Japanese Patent Application Publication Tokukai No. 2015-156894

SUMMARY OF INVENTION

Technical Problem

A doctor ascertains structural characteristics of lesion areas in tissues, and also understands how each lesion area can be captured as an image. The doctor then determines, based on a captured image of a tissue, a change that has occurred in the tissue.

For example, based on properties of a nodular shadow found from a lung CT image of a patient, a doctor can infer and determine a type of pulmonary nodule. An image analysis technique is demanded that makes it possible to determine a type of pulmonary nodule from a nodular shadow at the same level as determination of a type of pulmonary nodule by a doctor. Such an image analysis technique can be utilized in detection and determination of lesions in a variety of organs and tissues, as well as in interpretation of lung CT images.

In recent years, various techniques have been devised in which a computer (artificial intelligence) autonomously outputs an inference result by learning enormous amounts of image data by itself. For example, it is possible that an artificial intelligence which has learned correspondences between tissue images determined by a doctor and determination results is created, and an inference result is outputted by inputting a tissue image to be analyzed into the artificial intelligence. However, the inference obtained using the artificial intelligence has a problem that a user such as a doctor cannot understand an outputted inference result. This is because the grounds based on which the artificial intelligence has outputted the inference result are often incomprehensible from the analyzed image. In a case where the grounds for outputting the inference result are unknown, it is difficult to utilize the inference result as it is for current medical treatment.

An aspect of the present invention has been made so as to solve the problem, and an object of an aspect of the present invention is to achieve, for example, an image analyzing method and an image analyzing device each of which is for highly accurately determining, like a doctor does, a change that has occurred in a tissue, by analyzing a tissue image based on a structural characteristic of the change that has occurred in the tissue.

Solution to Problem

In order to attain the object, an image analyzing method in accordance with an aspect of the present invention is a method for analyzing a tissue image obtained by capturing an image of a tissue, and the method includes: a binarizing step of extracting, from the tissue image, a target region image to be analyzed and generating, with respect to the target region image, a plurality of binarized images having respective binarization reference values different from each other; a feature number calculating step of calculating, with respect to each of the plurality of binarized images, a feature number including a first feature number that indicates the number of hole-shaped regions, each of the hole-shaped regions being surrounded by pixels each having a first pixel value obtained by binarization, and each of the hole-shaped regions being constituted by pixels each having a second pixel value obtained by the binarization; a reference value specifying step of specifying a binarized image in which the first feature number is maximized and specifying (i) a first reference value that indicates a binarization reference value in the binarized image which has been specified and (ii) a maximum first feature number that indicates the first feature number in the binarized image; and a determining step of determining, based on the first reference value and the maximum first feature number, a change that has occurred in the tissue.

In order to attain the object, an image analyzing device in accordance with an aspect of the present invention is an image analyzing device for analyzing a tissue image obtained by capturing an image of a tissue, and the image analyzing device includes: a binarizing section that extracts, from the tissue image, a target region image to be analyzed and generates, with respect to the target region image, a plurality of binarized images having respective binarization reference values different from each other; a feature number calculating section that calculates, with respect to each of the plurality of binarized images, a first feature number that indicates the number of hole-shaped regions, each of the hole-shaped regions being surrounded by pixels each having a first pixel value obtained by binarization, and each of the hole-shaped regions being constituted by pixels each having a second pixel value obtained by the binarization; a reference value specifying section that specifies a binarized image in which the first feature number is maximized and specifies (i) a first reference value that indicates a binarization reference value in the binarized image which has been specified and (ii) a maximum first feature number that indicates the first feature number in the binarized image; and a determining section that determines, based on the first reference value and the maximum first feature number, a change that has occurred in the tissue.

The image analyzing device in accordance with each of the aspects of the present invention can be realized by a computer. In such a case, the present invention encompasses (i) a control program of the image analyzing device which causes the computer to serve as the units (software elements) included in the image analyzing device for realizing the image analyzing device and (ii) a computer-readable recording medium in which the control program is recorded.

Advantageous Effects of Invention

According to an aspect of the present invention, it is possible to highly accurately determine a change that has occurred in a tissue, by analyzing a tissue image based on a structural characteristic of the change that has occurred in the tissue.

BRIEF DESCRIPTION OF DRAWINGS

FIG. 26 is a diagram illustrating an example of a determination criterion.

DESCRIPTION OF EMBODIMENTS

Embodiment 1

Figure 1:
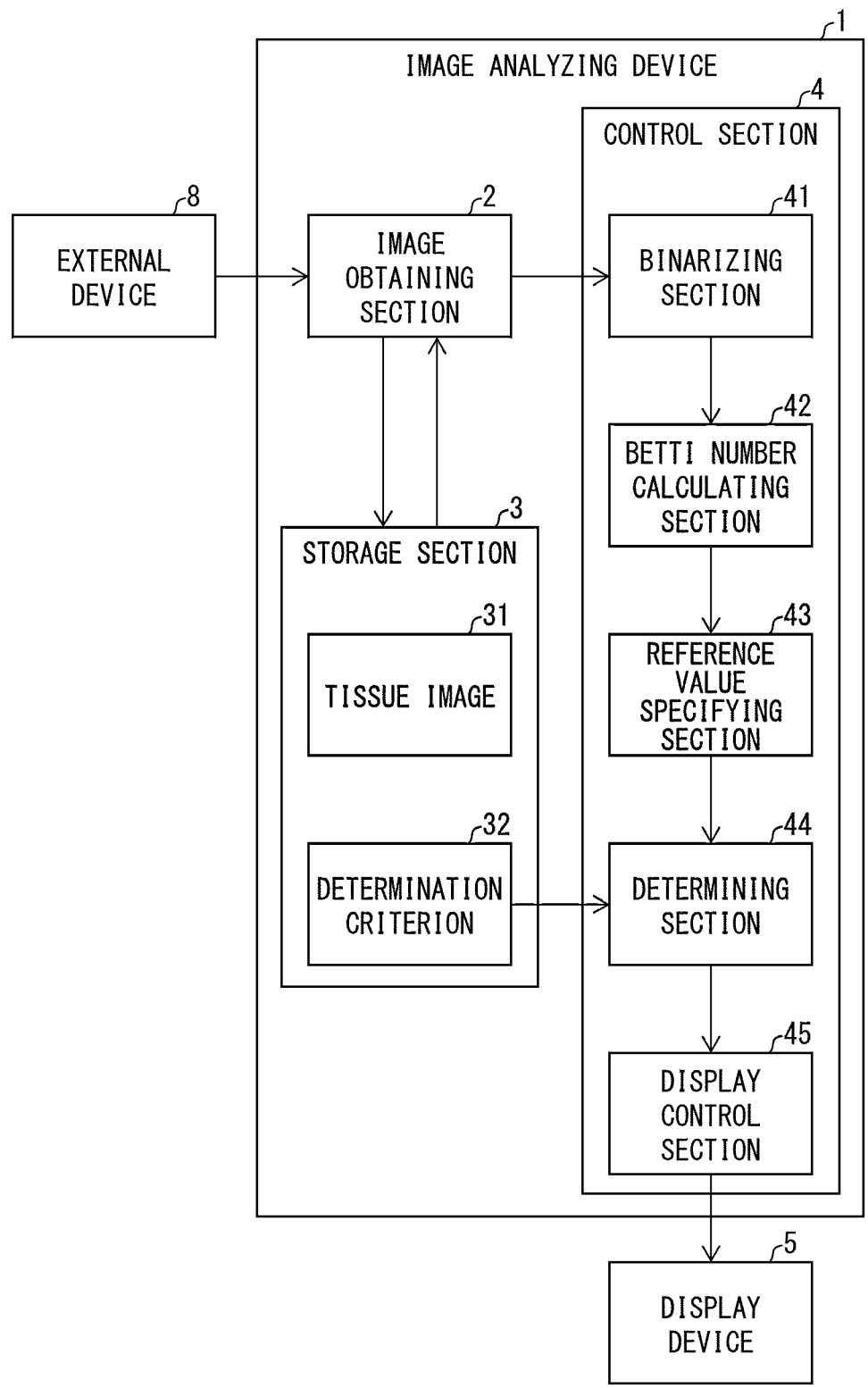
FIG. 1 is a functional block diagram illustrating a configuration example of an image analyzing device in accordance with an aspect of the present invention.

The following description will specifically discuss an embodiment of the present invention.

Technical Idea on the Present Invention

First, a technical idea on the present invention will be described below.

As an example of a tissue image, the inventors of the present invention have analyzed a region of a lung (tissue) in a computed tomography (CT) image obtained by imaging a chest of a subject. Specifically, the inventors of the present invention have compared and analyzed in detail a region in which a pulmonary nodule has not occurred and a region in which a pulmonary nodule has occurred in the lung CT image (tissue image).

Specifically, the inventors of the present invention have extracted a nodular shadow to be analyzed from the lung CT image, and generated, with respect to the nodular shadow, a plurality of binarized images having respective binarization reference values different from each other. Then, the inventors of the present invention have analyzed, for each of the binarized images, how a one-dimensional Betti number $b1$ (first feature number) and a zero-dimensional Betti number $b0$ (second feature number), which have been calculated, change when the binarization reference value is changed.

As a result, the inventors of the present invention have found that it is possible to highly accurately determine a type of pulmonary nodule from which a nodular shadow is derived, based on a binarization reference value with which the one-dimensional Betti number $b1$ is maximized and on a maximum value of the one-dimensional Betti number $b1$.

Further, the inventors of the present invention have also found that, by further utilizing (1) through (3) described below, it is possible to improve the accuracy of determination of a pulmonary nodule and to enhance efficiency of the determination process.

(1) A binarization reference value with which the zero-dimensional Betti number $b0$ is maximized, and a maximum value of the zero-dimensional Betti number $b0$ (2) A ratio between the one-dimensional Betti number $b1$ and the zero-dimensional Betti number $b0$ (3) The one-dimensional Betti number $b1$ and the zero-dimensional Betti number $b0$ per unit area of a nodular shadow (Mathematical Representation for Analysis of Tissue Image)

Next, the following description will discuss a mathematical representation applied to analyze a tissue image in the image analyzing method in accordance with an aspect of the present invention.

In order to quantify and analyze a change that has occurred in a tissue, the image analyzing method in accordance with an aspect of the present invention applies the concept of homology, in particular, persistent homology, with respect to a binarized image. Homology is one of mathematical fields which facilitates an analysis of, for example, connection between figures by algebraically substituting morphological characteristics of the figures.

The concept of homology is a mathematical concept indicative of connection and contact between constituents. In a tissue image, an appropriate binarization reference value (also referred to as a binarization parameter) is set so that the tissue image is binarized. Then, from the binarized image, a zero-dimensional Betti number and a one-dimensional Betti number $b1$ are calculated. The zero-dimensional Betti number $b0$ and the one-dimensional Betti number $b1$ each having been thus calculated can be used to (i) assess a degree of connection between constituents of the tissue and (ii) assess a degree of contact between the constituents.

A Betti number is a topological pointer number which is independent of a shape of each of figures (for example, corresponding to constituents of a tissue) but is dependent on merely contact and separation between figures. In a case where a q-th singular homology group is finitely generated, the q-th singular homology group can be expressed by a direct sum of a free Abelian group and a finite Abelian group. A rank of the free Abelian group is called a "Betti number".

<Zero-Dimensional Betti Number $b0$>

A zero-dimensional Betti number $b0$ is mathematically defined as follows. The number of connected components of a figure (also called a "one-dimensional complex") K obtained by connecting a finite number of line segments is generally referred to as a zero-dimensional Betti number. The expression "a figure obtained by connecting a finite number of points with use of a finite number of line segments is connected" means that it is possible to reach any second vertex from any first vertex of the figure by following a side of the figure.

In each of a plurality of binarized images generated with use of different binarization reference values, the number of connected regions obtained by connecting pixels each having one of pixel values obtained by binarization (e.g., a pixel value of 0 obtained as a result of binarization) is a zero-dimensional Betti number $b0$.

<One-Dimensional Betti Number $b1$>

A one-dimensional Betti number $b1$ is mathematically defined as follows. A one-dimensional Betti number $b1$ of the figure K is "r" in a case where the following conditions (1) and (2) are satisfied.

(1) The number of connected components of the figure K remains unchanged even in a case where any r one-dimensional simplices (e.g., line segments), each of which is opened (i.e., does not include both ends), are removed from the figure (i.e., a connected one-dimensional complex) K obtained by connecting a finite number of line segments.

(2) The figure K is not a connection (i.e., the number of connected components of the figure K is increased by one (1)) in a case where any (r+1) one-dimensional simplices, each of which is opened, are removed from the figure K.

In each of a plurality of binarized images generated with use of different binarization reference values, the number of hole-shaped regions (e.g., a pixel value of 255 obtained as a result of binarization) each of which is surrounded by pixels each having one of pixel values obtained by binarization (e.g., a pixel value of 0 obtained as a result of binarization) is the one-dimensional Betti number $b1$.

<Zero-Dimensional Betti Number $b0$ and One-Dimensional Betti Number $b1$ in Exemplary Figure>

Figure 2:
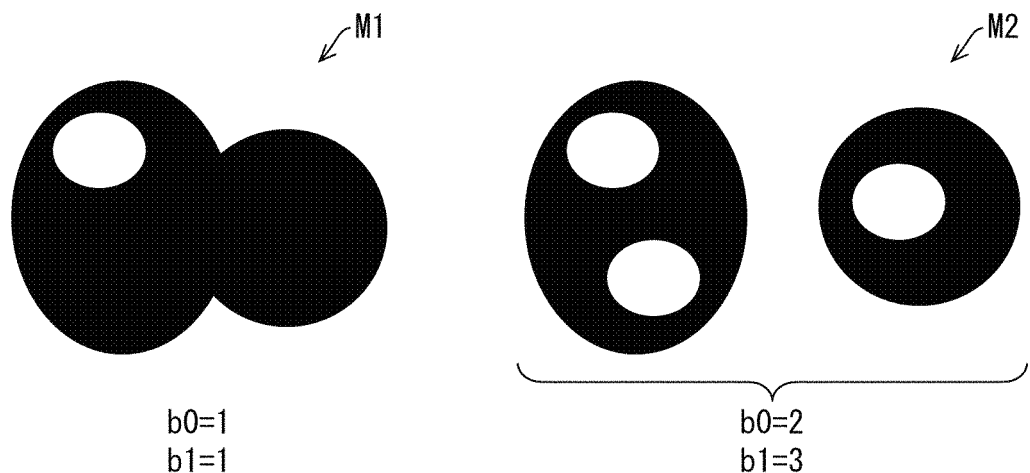
FIG. 2 is a schematic diagram for explaining a Betti number in the concept of homology.

The zero-dimensional Betti number $b0$ and the one-dimensional Betti number $b1$ in a binarized image will now be described using an exemplary figure illustrated in FIG. 2. FIG. 2 is a schematic diagram for explaining a Betti number in the concept of homology. In a case of a figure M1 illustrated in FIG. 2, the number of black regions is one. The zero-dimensional Betti number b0 of the figure M1 is therefore 1. In the case of the figure M1, the number of white regions surrounded by the black region is one. The one-dimensional Betti number b1 of the figure M1 is therefore 1.

In a case of a figure M2 illustrated in FIG. 2, the number of black regions is two. The zero-dimensional Betti number b0 of the figure M2 is therefore 2. In the case of the figure M2, the number of white regions surrounded by the black regions is three. The one-dimensional Betti number b1 of the figure M2 is therefore 3.

In a case of a two-dimensional image, a zero-dimensional Betti number b0 indicates the number of sets of components which are connected to each other, and a one-dimensional Betti number b1 indicates the number of spaces (hereinafter sometimes referred to as "hole-shaped regions") each of which is surrounded by the connected components serving as an outer edge of the space. The number of hole-shaped regions indicates the total number of "holes" present in the connected components.

(Tissue Image to be Analyzed and Object to be Analyzed)

The following description will discuss, as an example, an image analyzing device 1 which analyzes a nodular shadow in a lung CT image to determine a change that has occurred in the lung (e.g., whether or not a pulmonary nodule has occurred and a type of pulmonary nodule). Note, however, that the tissue image to which the image analyzing method in accordance with an aspect of the present invention can be applied is not limited to the lung CT image.

The image analyzing method in accordance with an aspect of the present invention is applicable to a variety of medical images (tissue image), such as (1) through (5) below.

(1) Images of a brain, pancreas, and the like captured by magnetic resonance imaging (MRI) scans
(2) Images of a liver, a breast, and the like captured in x-ray (including mammography) examination
(3) Positron emission tomography (PET)
(4) Positron emission tomography/CT (PET-CT)
(5) Single-photon emission coupled tomography/CT (SPECT-CT)

An image of a region to be analyzed by the image analyzing method in accordance with an aspect of the present invention is not limited to a nodular shadow. For example, an image of any lesion area found in the images of (1) through (5) above can be subject to the image analyzing method in accordance with an aspect of the present invention.

(Feature of Nodular Shadow in Lung CT Image and Type of Pulmonary Nodule)

Figure 3:
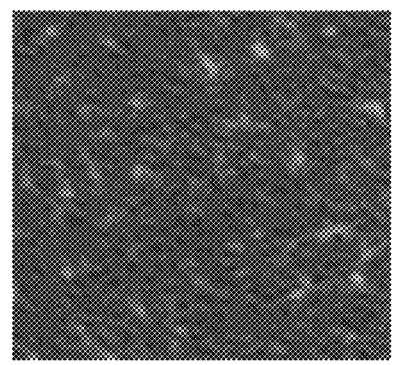
FIG. 3 is a diagram illustrating an example of a CT image of a region of a lung field without a nodule.
Figure 4:
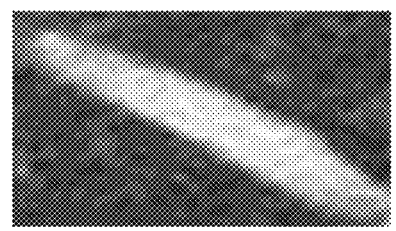
FIG. 4 is a diagram illustrating an example of a CT image of a region of a pulmonary vessel.
Figure 5:
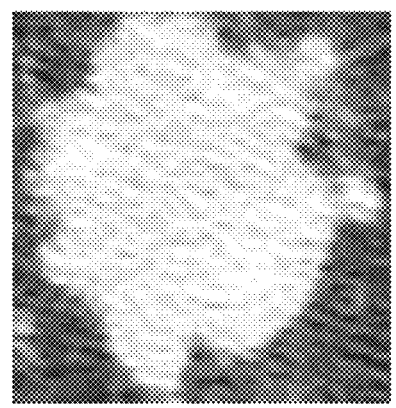
FIG. 5 is a diagram illustrating an example of a CT image of a region of a lung in which a solid nodule has occurred.
Figure 6:
FIG. 6 is a diagram illustrating an example of a CT image of a region of a lung in which a ground-glass nodule has occurred.

First, a type of pulmonary nodule which is determined on the basis of a lung CT image will be described with reference to FIGS. 3 through 6. FIG. 3 is a diagram illustrating an example of a CT image of a region of a lung field without a nodule. FIG. 4 is a diagram illustrating an example of a CT image of a region of a pulmonary vessel. FIG. 5 is a diagram illustrating an example of a CT image of a region of a lung in which a solid nodule has occurred. FIG. 6 is a diagram illustrating an example of a CT image of a region of a lung in which a ground-glass nodule has occurred.

In a lung CT image, a region having a lower X-ray absorption rate is indicated with a higher degree of blackness as compared to a region having a higher X-ray absorption rate. In a lung CT image, a normal lung is shown as a blackish region over which a light milk-white haze hangs, as illustrated in FIG. 3. A pulmonary vessel can be shown as a circular or elliptical image having an inner part that is whiter than the surroundings, as illustrated in FIG. 4. A nodular shadow is shown as a "substantially-circular shadow" having an inner part that is whiter than the surroundings, as illustrated in FIGS. 5 and 6.

A pulmonary nodule is detected in a lung CT image as a circular or spindle-shaped nodular shadow of 3 cm or smaller in greatest dimension, or as a nodular shadow visible as a region in which an absorption value is increasing and which has an irregular boundary. Pulmonary nodules are classified into a solid nodule, a ground-glass nodule, a mixed nodule, and the like based on properties of nodular shadows.

A solid nodule (see FIG. 5) is a nodule having an inner part which is filled with a region of soft tissue absorption value (i.e., a white region). A ground-glass nodule (see FIG. 6) is a nodule which has an inner part whose degree of whiteness is lower than that of a solid nodule, and in which boundaries of a pulmonary vessel and a bronchial tube can be seen therein. A mixed nodule (not illustrated) is also referred to as "part-solid nodule". The mixed nodule is a nodule having therein both a ground-glass nodule region and a solid nodule region.

(Overview of Image Analyzing Method)

Figure 7:
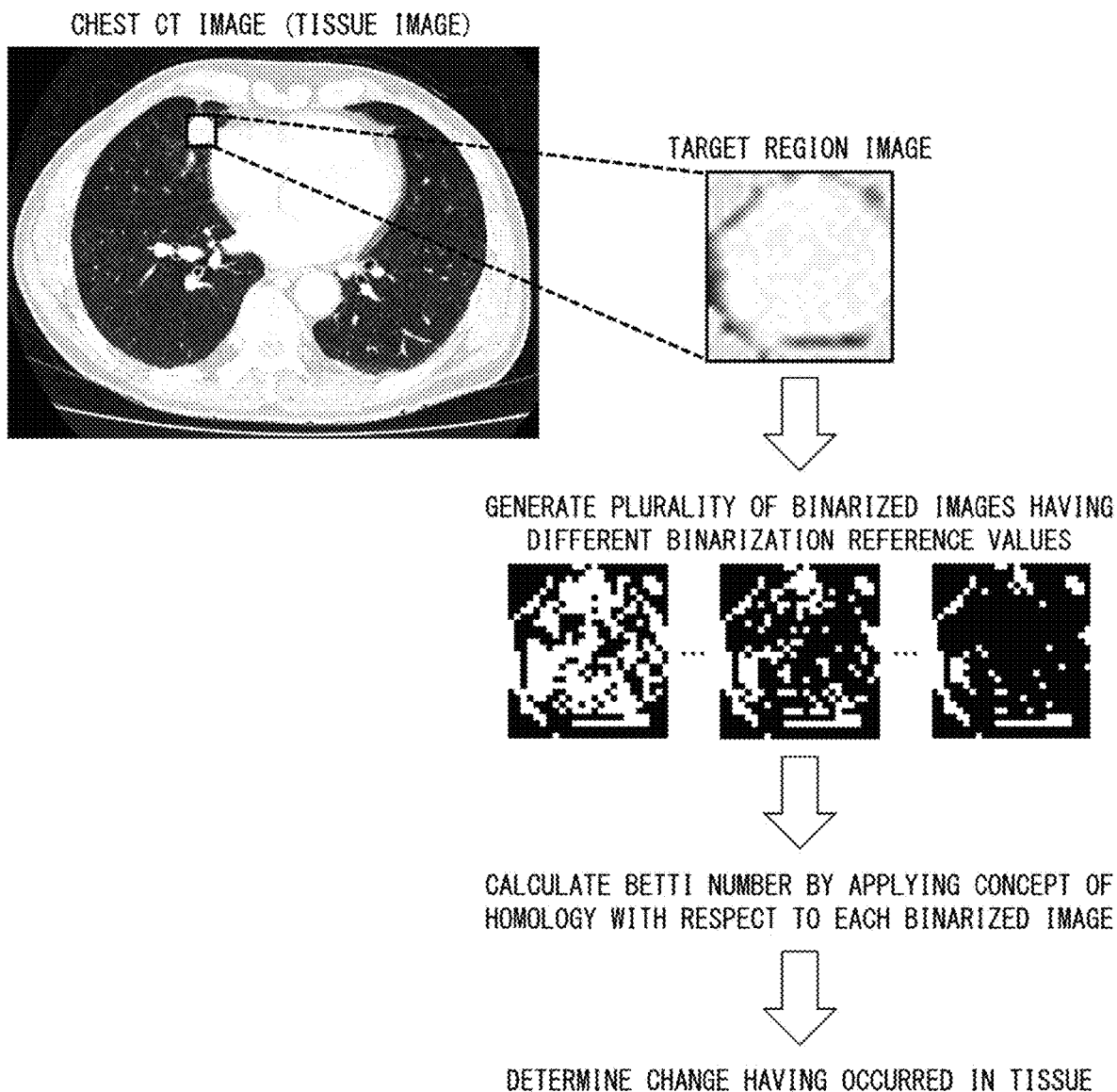
FIG. 7 is a diagram schematically illustrating an outline of a process flow in a case where an image analyzing device in accordance with an aspect of the present invention is applied to analysis of a lung CT image.

The following description will discuss an overview of a flow of image analysis in accordance with an aspect of the present invention with reference to FIG. 7. FIG. 7 is a diagram schematically illustrating an outline of a process flow in a case where the image analyzing device 1 in accordance with an aspect of the present invention is applied to analysis of a lung CT image.

First, the image analyzing device 1 extracts an image of a region to be analyzed (hereinafter referred to as "target region image") from a chest CT image. Next, the image analyzing device 1 generates, with respect to the extracted target region image, a plurality of binarized images having respective binarization reference values different from each other.

Next, with respect to each of the generated binarized images, the image analyzing device 1 calculates a Betti number by applying the concept of homology, and analyzes the target region image.

The image analyzing device 1 determines a change that has occurred in a lung (tissue) as a result of analyzing the target region image.

(Configuration of Image Analyzing Device 1)

Next, the following description will discuss, with reference to FIG. 1, a configuration of the image analyzing device 1 that carries out the processes in the image analyzing method in accordance with an aspect of the present invention. FIG. 1 is a block diagram illustrating a configuration example of the image analyzing device 1 in accordance with an aspect of the present invention. In FIG. 1, an external device 8 for transmitting an image to the image analyzing device 1 is also illustrated.

As illustrated in FIG. 1, the image analyzing device 1 includes an image obtaining section 2, a storage section 3, and a control section 4. The storage section 3 stores therein at least a tissue image 31 and a determination criterion 32.

The image obtaining section 2 obtains, from the external device 8, a tissue image obtained by imaging a tissue. In a case where a tissue to be analyzed is a lung, the image obtaining section 2 obtains, from the external device 8, a chest CT image (see FIG. 7) obtained by capturing an image of a chest of a subject with an appropriate contrast. The contrast of the chest CT image and the like can be set as appropriate in accordance with an X-ray absorption rate of a tissue to be analyzed.

The image obtaining section 2 stores, in the storage section 3, the chest CT image thus obtained. The image obtaining section 2 can obtain, from the external device 8, a CT image obtained by extracting a lung region from a chest CT image (hereinafter, referred to as "lung CT image"), or an image obtained by cutting out a region having a feature as a nodular shadow along the contour from a lung CT image. The image obtaining section 2 can be configured to store the obtained image in the storage section 3 (described later). Alternatively, the image obtaining section 2 can output the obtained image directly to the control section 4 (described later).

The external device 8 can be, for example, a CT device, a personal computer connected to a CT device, or can be a server device that stores and/or manages image data. In FIG. 1, the image analyzing device 1 obtains a tissue image from the external device 8, which is separate from the image analyzing device 1. Note, however, that the present invention is not limited to this example. For example, the image analyzing device 1 can be embedded in the external device 8, or the image analyzing device 1 can have a function of the external device 8.

In addition to the tissue image 31 and the determination criterion 32, the storage section 3 stores a control program, an OS program, an application program, and the like executed by the control section 4 for the sections. The storage section 3 stores various kinds of data to be read when the control section 4 executes these programs. The storage section 3 is constituted by a nonvolatile storage device such as a hard disk or a flash memory. Note that the image analyzing device 1 can include not only the storage section 3 but also a storage device that (i) is used as a working area in which data is temporarily stored while the programs are being executed and (ii) is exemplified by a volatile storage device such as a random access memory (RAM).

The display device 5 is a display device that displays information and the like outputted by the control section 4, and is, for example, a liquid crystal display. The display device 5 can be a dedicated display included in the image analyzing device 1. Note that the display device 5 can be configured such that a touch sensor is provided on a display screen of the display device 5 so as to detect a touch operation conducted, by a user, with respect to a surface of the display screen.

FIG. 1 illustrates an example in which the image analyzing device 1 is connected to the display device 5 (presenting section) that is provided separately from the image analyzing device 1. Note, however, that a configuration of the image analyzing device 1 is not limited to such an example. For example, the image analyzing device 1 can be configured to include the display device 5 (presenting section) that is embedded therein.

The image analyzing device 1 and the external device 8, and the image analyzing device 1 and the display device 5 can be connected by wireless communication or wired communication.

<Configuration of Control Section 4>

The control section 4 determines a type of pulmonary nodule by analyzing an image of a region to be analyzed (hereinafter, referred to as "target region image"), such as a region having a feature as a nodular shadow, and outputs the determination result. The control section 4 includes a binarizing section 41, a Betti number calculating section 42 (feature number calculating section), a reference value specifying section 43, a determining section 44, and a display control section 45.

[Binarizing Section 41]

The binarizing section 41 extracts a target region image to be analyzed from a lung CT image, carries out a binarization process with respect to the target region image, and generates a plurality of binarized images having respective binarization reference values different from each other (see FIG. 7).

The binarizing section 41 can have a known image-recognition function. Thus, in a case where a chest CT image is obtained from the external device 8, the binarizing section 41 can extract a lung CT image from the chest CT image by the known image-recognition function. A lung has an X-ray absorption rate lower than that of surrounding tissues, and therefore the lung CT image can be cut out from the chest CT image using a known image processing technique.

The binarizing section 41 can further have a function to extract a target region image from a lung CT image. The image obtaining section 2 can store the extracted target region image in the storage section 3 or can output the extracted target region image to the binarizing section 41.

The binarizing section 41 capable of extracting a target region image from a lung CT image can be realized by applying a known technique such as deep learning. For example, the binarizing section can be subjected to deep learning using, as training data, correspondences between chest CT images and target region images (e.g., images having features as a nodular shadow) to be detected (or cut out) from the chest CT images. Here, the chest CT image used as the training data can be, for example, a chest CT image including an image of a region in which a feature as a nodular shadow has been recognized in advance by interpretation by a doctor. By applying such deep learning to the binarizing section 41, the binarizing section 41 can extract a target region image from a lung CT image extracted from a chest CT image.

In the binarization process, the binarizing section 41 converts (i) pixels each having a pixel value (or CT value) greater than a binarization reference value into white pixels and (ii) pixels each having a pixel value equal to or smaller than the binarization reference value into black pixels. In this case, the binarizing section 41 generates a plurality of binarized images by binarizing, every time the binarizing section 41 changes the binarization reference value, a single CT image obtained by capturing an image of a lung. That is, the binarizing section 41 generates, with respect to a lung CT image, a plurality of binarized images having respective binarization reference values different from each other.

In this specification, an example will be described in which the binarizing section 41 sets a binarization reference value based on pixel values of respective pixels of a target region image that is displayed as a gray scale image. That is, the binarizing section 41 sets a binarization reference value within a range between 0 and 255. For example, in a case where a binarization reference value is set to a pixel value of 100, a pixel value of a pixel that has a pixel value of not more than 100 becomes 0 as a result of the binarization process, and a pixel value of a pixel that has a pixel value of more than 100 becomes 255 as a result of the binarization process.

The manner of setting the binarization reference value is not limited to this example. For example, a binarization reference value can be set to a CT value of −1000 HU to −700 HU, which is commonly set in a chest CT image that is captured to image a lung. In a case where the binarization reference value is set to −900 HU, a pixel value of a pixel that has a CT value of not more than −900 HU becomes 0 as a result of the binarization process, and a pixel value of a pixel that has a CT value of more than −900 HU becomes 255 as a result of the binarization process.

The binarizing section 41 can limit a range of CT values in a target region image prior to the binarization process. In a lung CT image, a region having a CT value range of 0 HU to 1000 HU is ignored and therefore, for example, an object to be subjected to the binarization process can be limited to a region having a CT value range of −1000 HU to 0 HU. In this case, CT values in a range of −1000 HU to 0 HU are associated with pixel values in a range of 0 to 255. For example, a value obtained by rounding off a decimal point of a value of 255×(CT value)/(CT value range in target region image) can be determined as a pixel value corresponding to the CT value.

[Betti Number Calculating Section 42]

The Betti number calculating section 42 calculates, for each of a plurality of binarized images, a one-dimensional Betti number b1 indicating the number of hole-shaped regions. Each of the hole-shaped regions is surrounded by pixels each having one pixel value (first pixel value) obtained by binarization, and each of the hole-shaped regions is constituted by pixels each having the other pixel value (second pixel value) obtained by the binarization.

The Betti number calculating section 42 can further calculate, for each of the plurality of binarized images, a zero-dimensional Betti number b0 indicating the number of connected regions each of which is constituted by connection of pixels each having one (first pixel value) of the first pixel value and the second pixel value obtained by binarization.

For example, the connected regions are each a region in which pixels each having a pixel value, obtained by the binarization process, of 0 have gathered while being adjacent to each other. The connected regions are each surrounded by pixels each having a pixel value of 255 after the binarization process, and are independent of each other.

The holes are each an opening that has, as its outer edge, at least part of an outer edge of at least one constituent (in a case of a single constituent, an entire outer edge of the single constituent). In other words, the holes each surrounded by an outer edge of a constituent include (i) a hole that a single constituent has therein and (ii) a hole that is surrounded by respective portions of outer edges of a plurality of constituents connected to each other.

Values of the one-dimensional Betti number b1 and the zero-dimensional Betti number b0 calculated by the Betti number calculating section 42 depend on an area of a region imaged in a target region image. Therefore, the Betti number calculating section 42 preferably calculates the one-dimensional Betti number b1 and the zero-dimensional Betti number b0 in target region images in which areas of imaged regions are identical to each other.

The Betti number calculating section 42 can further calculate a ratio between the one-dimensional Betti number b1 and the zero-dimensional Betti number b0 with respect to each of the plurality of binarized images. In this specification, an example is described in which a value (b1/b0) is calculated by dividing the one-dimensional Betti number b1 by the zero-dimensional Betti number b0. Note, however, that the ratio between the one-dimensional Betti number b1 and the zero-dimensional Betti number b0 can be either b1/b0 or b0/b1.

An existing program can be employed as the Betti number calculating section 42. Examples of the exiting program encompass CHomP. The CHomP is freeware in compliance with the General Public License (GNU), and is available from a web site (http://chomp.rutgers.edu/). The existing program is not limited to CHomP. Any program other than the CHomP can be employed, provided that a zero-dimensional Betti number b0 and a one-dimensional Betti number b1 can be calculated from an image.

[Reference Value Specifying Section 43]

The reference value specifying section 43 specifies a binarized image in which the one-dimensional Betti number b1 is maximized, from among a plurality of binarized images generated by the binarizing section 41. In addition, the reference value specifying section 43 specifies a first reference value Ta and a maximum one-dimensional Betti number Va (maximum first feature number). Here, the first reference value Ta is a binarization reference value in the specified binarized image. The maximum one-dimensional Betti number Va is a one-dimensional Betti number b1 in the specified binarized image.

The reference value specifying section 43 can specify a binarized image in which b1/b0 is maximized. The reference value specifying section 43 can further specify a third reference value Tc indicating a binarization reference value in the specified binarized image and a value R of b1/b0 (hereinafter referred to as "maximum value R of b1/b0") (maximum third feature number) in the specified binarized image.

The reference value specifying section 43 can generate a graph obtained by plotting changes in zero-dimensional Betti number, in one-dimensional Betti number, and in b1/b0 which have occurred in accordance with a change in binarization reference value. The reference value specifying section 43 can read, from the generated graph, the first reference value Ta, the maximum one-dimensional Betti number Va, the second reference value Tb, the maximum zero-dimensional Betti number Vb, the third reference value Tc, the maximum value R of b1/b0, and the like.

[Determining Section 44]

The determining section 44 determines, based on (1) and (2) below, a change that has occurred in a lung.

(1) First reference value Ta
(2) Maximum one-dimensional Betti number Va

The determining section 44 can be configured to refer to the determination criterion 32 for determining a change that has occurred in a lung. The determination criterion 32 will be described later with reference to specific examples.

The accuracy of determination with respect to a target region image by the determining section 44 can be improved by applying a known technique such as deep learning. For example, in deep learning, (Training data) below and the like can be used. (Training data): Data including combinations of parameters (e.g., (1) through (6) above) used by the determining section 44 for determination with respect to a target region image and results determined by a doctor with respect to the target region image.

[Display Control Section 45]

The display control section 45 causes the display device 5 to display information indicating a determination result outputted from the determining section 44. The display control section 45 can cause the display device 5 to display a chest CT image (or a lung CT image) used for extracting a target region image together with the information indicating the determination result.

The display control section 45 can cause the display device 5 to display information indicating a position of the target region image in the chest CT image (or the lung CT image) together with the determination result and the chest CT image (or the lung CT image).

With this configuration, the image analyzing device 1 can present a determination result while allowing a user to visually recognize a target region image in a chest CT image (or a lung CT image). Here, the user can include a doctor, a laboratory technician, a researcher, and the like.

A manner of presenting a determination result to the user can be in a desired aspect. For example, as illustrated in FIG. 1, the determination result can be displayed on the display device 5, or can be outputted from a printer (not illustrated), a speaker (not illustrated), or the like.

(Flow of Process Carried Out by Image Analyzing Device 1)

Figure 8:
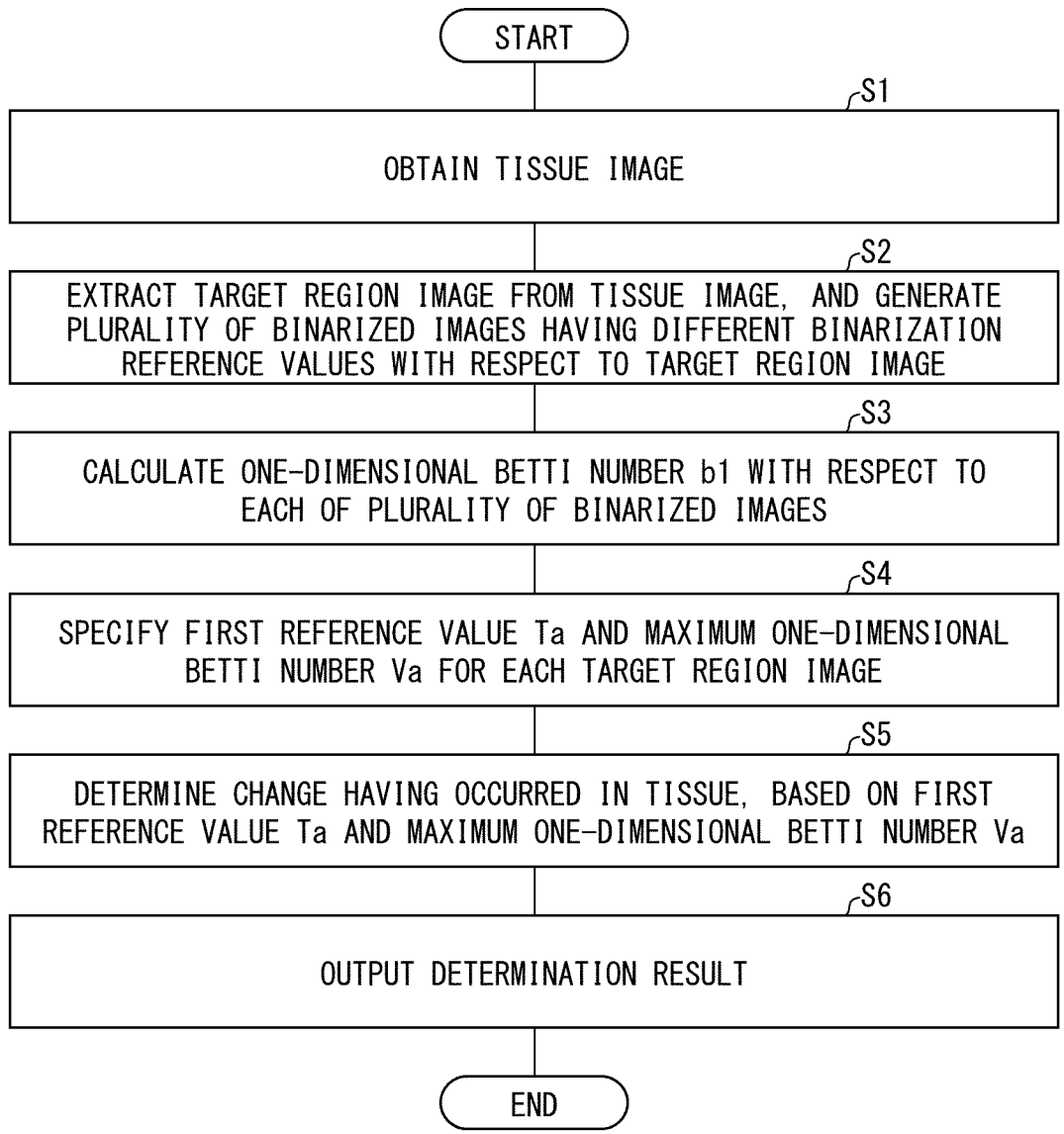
FIG. 8 is a flowchart illustrating an example of a flow of a process carried out by the image analyzing device.

The flow of the process carried out by the image analyzing device 1 will be described using FIG. 8, with reference to FIGS. 9 through 12 as appropriate. FIG. 8 is a flowchart illustrating an example of a flow of a process carried out by the image analyzing device 1.

First, the image obtaining section 2 obtains, from the external device 8, a tissue image obtained by imaging a tissue (step S1).

Next, the binarizing section 41 extracts a target region image from the tissue image, and generates, with respect to the target region image, a plurality of binarized images having respective binarization reference values different from each other (step S2: binarizing step).

Subsequently, the Betti number calculating section 42 calculates a one-dimensional Betti number b1 for each of the plurality of binarized images (step S3: feature number calculating step).

Figure 9:
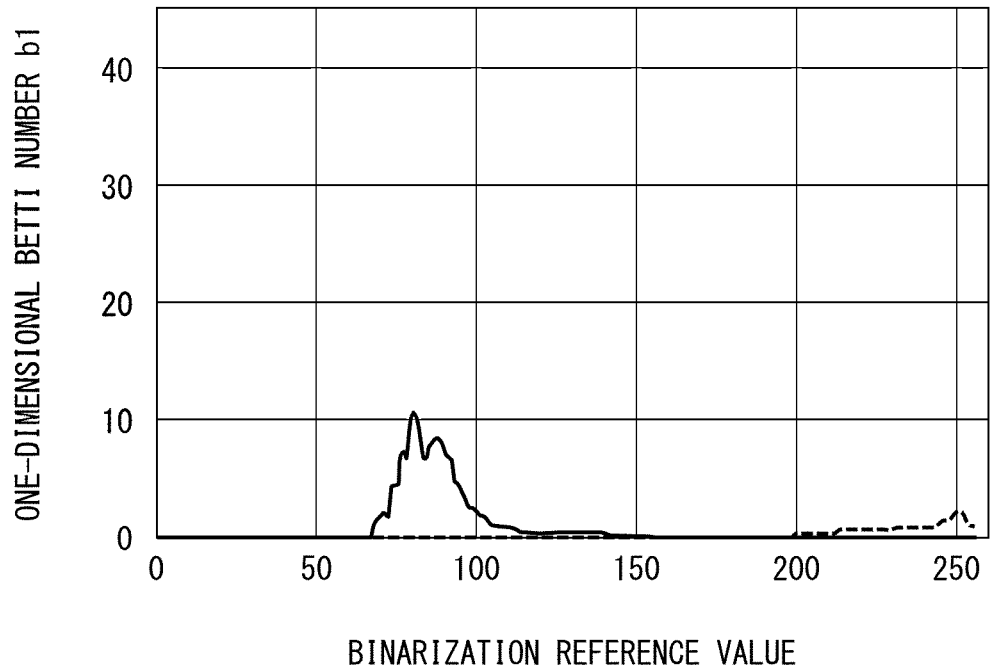
FIG. 9 is a graph obtained by plotting a change in one-dimensional Betti number that has occurred in accordance with a change in binarization reference value in binarized images, which have been generated for regions of a lung field without a nodule and a pulmonary vessel.

FIG. 9 is a graph obtained by plotting a change in one-dimensional Betti number b1 that has occurred in accordance with a change in binarization reference value in binarized images, which have been generated for regions of a lung field without a nodule and a pulmonary vessel. In FIG. 9, the one-dimensional Betti number b1 for the target region image of a lung field without a nodule is indicated by the solid line, and the one-dimensional Betti number b1 for the target region image of a pulmonary vessel is indicated by the dashed line.

Figure 10:
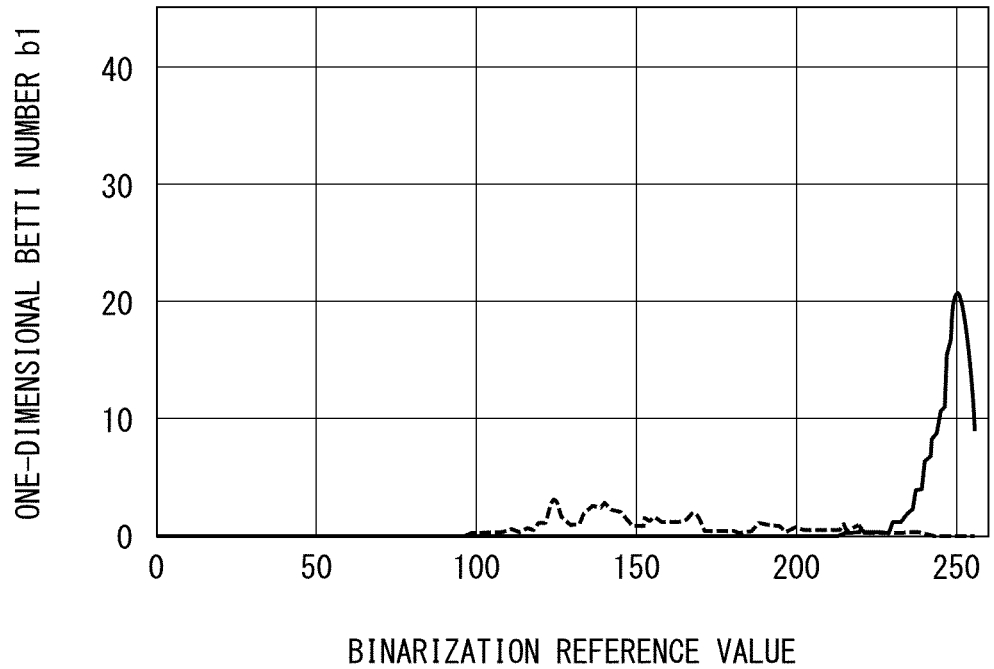
FIG. 10 is a graph obtained by plotting a change in one-dimensional Betti number that has occurred in accordance with a change in binarization reference value in binarized images, which have been generated for a region of a solid nodule and a region of a ground-glass nodule.

Meanwhile, FIG. 10 is a graph obtained by plotting a change in one-dimensional Betti number b1 that has occurred in accordance with a change in binarization reference value in binarized images, which have been generated for a region of a solid nodule and a target region image of a ground-glass nodule. In FIG. 10, the one-dimensional Betti number b1 for the target region image of a solid nodule is indicated by the solid line, and the one-dimensional Betti number b1 for the target region image of a ground-glass nodule is indicated by the dashed line.

Returning to FIG. 8, the reference value specifying section 43 specifies a binarized image in which the one-dimensional Betti number b1 is maximized, and specifies a first reference value Ta and a maximum one-dimensional Betti number Va (step S4: reference value specifying step).

Subsequently, the determining section 44 determines, based on the first reference value Ta and the maximum one-dimensional Betti number Va, a change that has occurred in a lung (step S5: determining step).

Figures 11, 12:
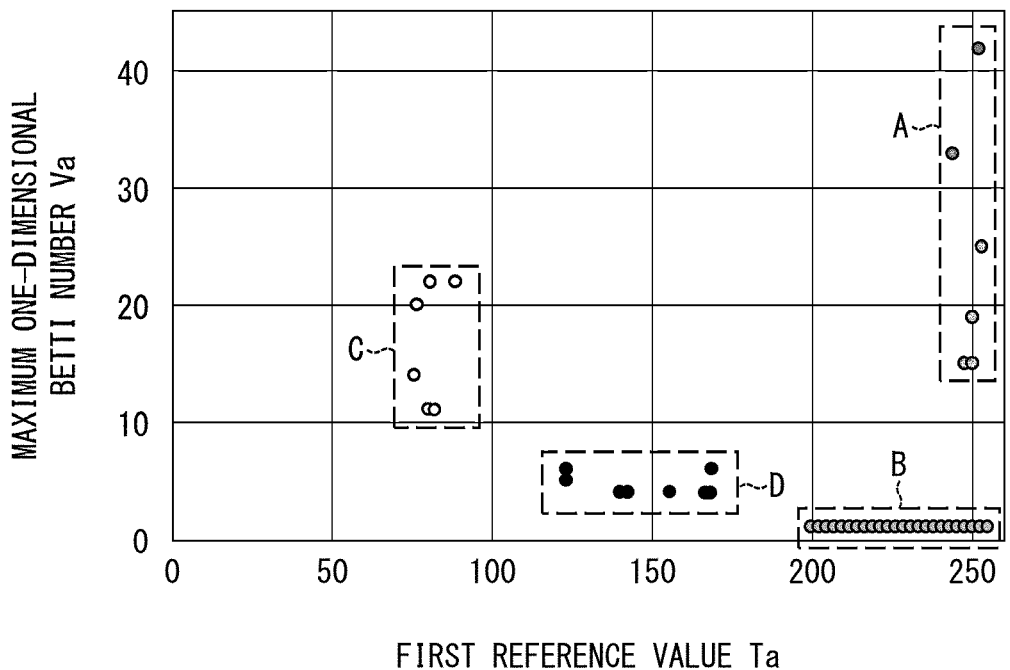
FIG. 11 is a graph obtained by plotting, for each target region image, a first reference value and a maximum one-dimensional Betti number.
FIG. 12 is a diagram illustrating an example of a determination criterion.

FIG. 11 is a graph obtained by plotting, for each target region image, a first reference value Ta and a maximum one-dimensional Betti number Va. As illustrated in FIG. 11, combinations of the first reference value Ta and the maximum one-dimensional Betti number Va which have been specified by the reference value specifying section 43 are clearly classified into four groups, i.e., groups A through D. Specifically, the group A is points at which the first reference value Ta and the maximum one-dimensional Betti number Va are plotted for a target region image of a solid nodule. The group B is points at which the first reference value Ta and the maximum one-dimensional Betti number Va are plotted for a target region image of a pulmonary vessel. The group C is points at which the first reference value Ta and the maximum one-dimensional Betti number Va are plotted for a target region image of a lung field without a nodule. The group D is points at which the first reference value Ta and the maximum one-dimensional Betti number Va are plotted for a target region image of a ground-glass nodule. Thus, based on the first reference value Ta and the maximum one-dimensional Betti number Va, it is possible to determine which one of a lung field without a nodule, a pulmonary vessel, a solid nodule, and a ground-glass nodule is indicated in the target region image.

FIG. 12 is a diagram illustrating an example of a determination criterion 32. The determining section 44 compares a first reference value Ta and a maximum one-dimensional Betti number Va which have been specified for a target region image with a first reference value Ta and a maximum one-dimensional Betti number Va which are defined in the determination criterion 32 to determine a change that has occurred in a lung, as described below.

In a case where the first reference value Ta specified for the target region image is 70 to 100 and the maximum one-dimensional Betti number Va specified for the target region image is 10 to 25, the determining section 44 determines that the target region image is an image of a lung field without a nodule.

In a case where the first reference value Ta specified for the target region image is 120 to 180 and the maximum one-dimensional Betti number Va specified for the target region image is 2 to 10, the determining section 44 determines that the target region image is an image of a ground-glass nodule.

In a case where the first reference value Ta specified for the target region image is 180 to 255 and the maximum one-dimensional Betti number Va specified for the target region image is 2 to 10, the determining section 44 determines that the target region image is an image of a pulmonary vessel.

In a case where the first reference value Ta specified for the target region image is 180 to 255 and the maximum one-dimensional Betti number Va specified for the target region image is 10 to 50, the determining section 44 determines that the target region image is an image of a solid nodule.

The display control section 45 outputs a result of the determination to the display device 5 (step S6).

The graphs illustrated in FIGS. 9 through 11 are each depicted using a binarized image which has been prepared as a result of the binarization process that has been carried out by the binarizing section 41 with respect to a target region image in which CT values in the range of −1000 HU to 0 HU are associated with pixel values in the range of 0 to 255. The value of the first reference value Ta in the determination criterion 32 will vary depending on how the binarizing section 41 has limited the range of CT values in a target region image prior to the binarization process. Therefore, in a case where the binarizing section 41 limits the range of CT values in a target region image prior to carrying out the binarization process, it is important to uniformize ranges of CT values in target region images.

According to the configuration, the image analyzing device 1 generates a plurality of binarized images having respective binarization reference values different from each other with respect to a target region image of a nodular shadow or the like, and calculates the one-dimensional Betti number for each of the binarized images. Then, the image analyzing device 1 specifies a binarized image in which the one-dimensional Betti number is maximized, and specifies the first reference value Ta and the maximum one-dimensional Betti number Va from the specified binarized image. The image analyzing device 1 determines presence or absence and a type of a pulmonary nodule, based on the specified first reference value Ta and maximum one-dimensional Betti number Va. With this configuration, whether or not a change has occurred in a lung and a type of the change in a target region image can be highly accurately determined based on a structural characteristic of the change that has occurred in the lung.

A lesion area in a lung can be visually recognized as an image different from the surroundings. The image analyzing device 1 mathematically analyzes properties of an image of a region to be analyzed using the concept of homology, and determines, based on the analysis result, a change that has occurred in a lung. That is, the determination result by the image analyzing device 1 is based on the properties of the target region image, as with a diagnosis result by a doctor in imaging diagnosis. Therefore, the image analyzing device 1 is capable of outputting a determination result that can be easily understood by the user. Many lesion areas occurring in tissues other than a lung are also known to be visually recognizable as images different from the surroundings. The image analyzing device 1 can highly accurately determine the presence or absence and type of any lesion area that can be detected by imaging diagnosis.

Embodiment 2

The following description will discuss another embodiment of the present invention. Note that, for convenience, members which have functions identical to those of the members described in Embodiment 1 are given respective identical reference numerals, and the descriptions of such members will not be repeated. In Embodiment 2, a zero-dimensional Betti number b0 calculated by the Betti number calculating section 42 is also used to determine a change that has occurred in a lung.

[Reference Value Specifying Section 43]

The reference value specifying section 43 can further specify a binarized image in which the zero-dimensional Betti number b0 is maximized, from among a plurality of binarized images generated by the binarizing section 41. Then, the reference value specifying section 43 specifies a second reference value Tb and a maximum zero-dimensional Betti number Vb (maximum second feature number). Here, the second reference value Tb is a binarization reference value in the specified binarized image. The maximum zero-dimensional Betti number Vb is a zero-dimensional Betti number b0 in the specified binarized image.

Note that the reference value specifying section 43 can generate a graph obtained by plotting changes in zero-dimensional Betti number and in one-dimensional Betti number which are caused in accordance with a change in binarization reference value. The reference value specifying section 43 can read, from the generated graph, the first reference value Ta, the maximum one-dimensional Betti number Va, the second reference value Tb, the maximum zero-dimensional Betti number Vb, and the like.

[Determining Section 44]

The determining section 44 determines, based on (1) through (4) below, a change that has occurred in a lung.
(1) First reference value Ta
(2) Maximum one-dimensional Betti number Va
(3) Second reference value Tb
(4) Maximum zero-dimensional Betti number Vb (Flow of Process Carried Out by Image Analyzing Device 1)

Figure 13:
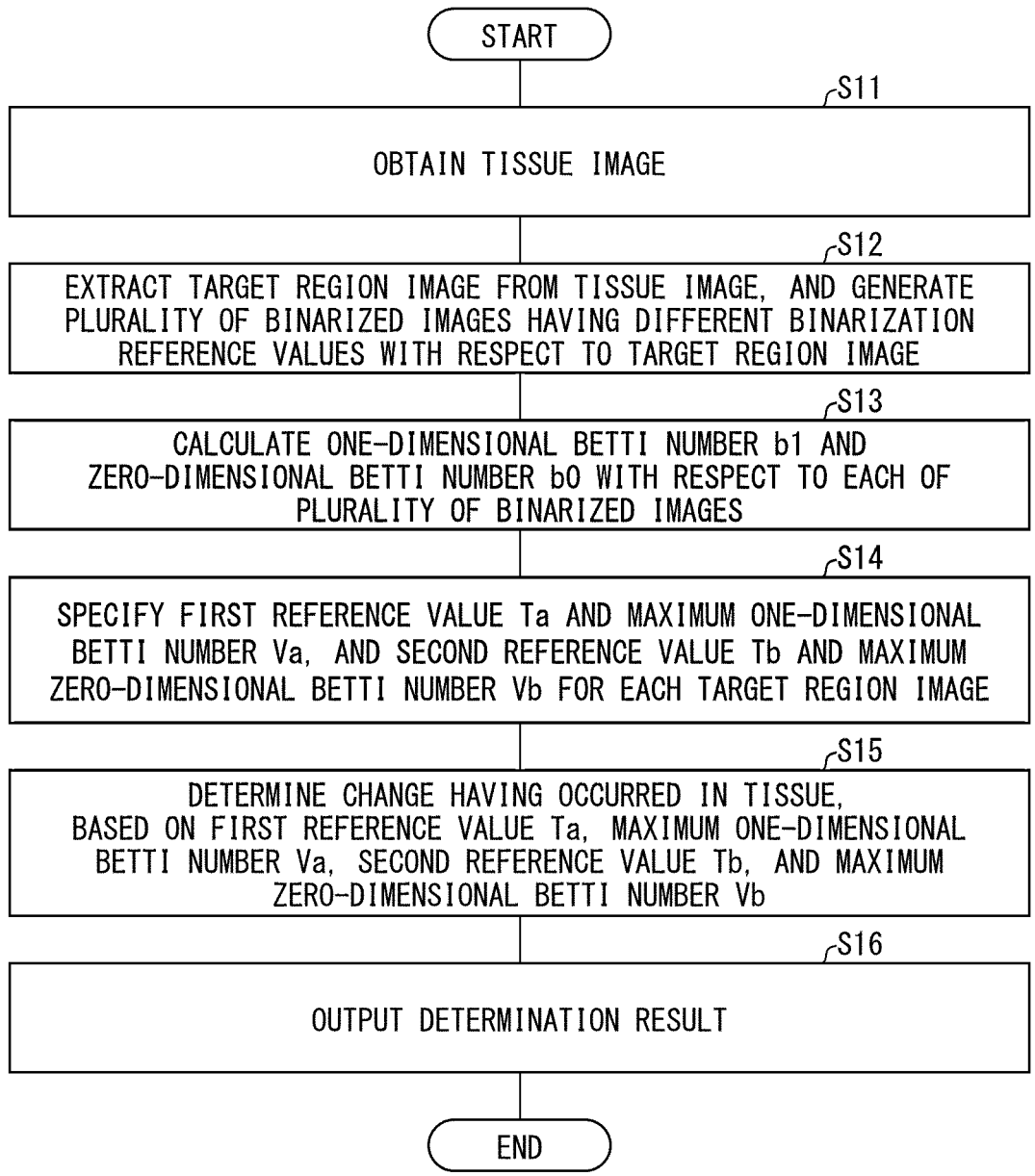
FIG. 13 is a flowchart illustrating an example of a flow of a process carried out by an image analyzing device in accordance with another aspect of the present invention.

The flow of the process carried out by the image analyzing device 1 in accordance with Embodiment 2 will be described using FIG. 13, with reference to FIGS. 14 through 17 as appropriate. FIG. 13 is a flowchart illustrating an example of a flow of a process carried out by an image analyzing device in accordance with another aspect of the present invention.

First, the image obtaining section 2 obtains, from the external device 8, a tissue image obtained by imaging a tissue (step S11).

Next, the binarizing section 41 extracts a target region image from the tissue image, and generates, with respect to the target region image, a plurality of binarized images having respective binarization reference values different from each other (step S12: binarizing step). The graphs illustrated in FIGS. 14 through 16 are each depicted using a binarized image which has been prepared as a result of the binarization process that has been carried out by the binarizing section 41 with respect to a target region image in which CT values in the range of −1000 HU to 0 HU are associated with pixel values in the range of 0 to 255.

Subsequently, the Betti number calculating section 42 calculates a one-dimensional Betti number b1 and a zero-dimensional Betti number b0 for each of the plurality of binarized images (step S13: feature number calculating step).

Figure 14:
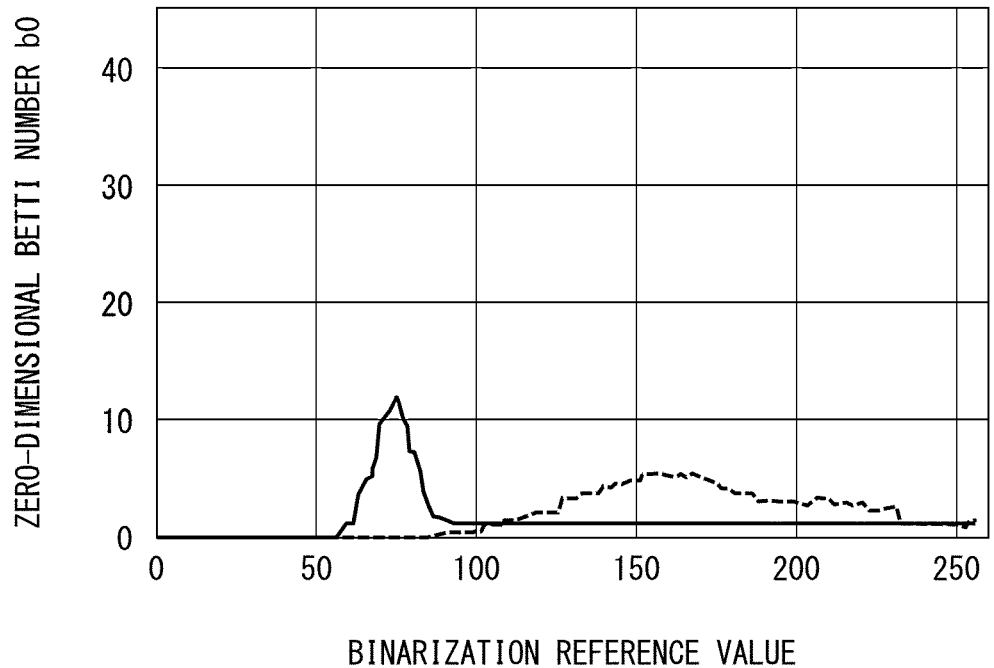
FIG. 14 is a graph obtained by plotting a change in zero-dimensional Betti number that has occurred in accordance with a change in binarization reference value in binarized images, which have been generated for regions of a lung field without a nodule and a pulmonary vessel.

FIG. 14 is a graph obtained by plotting a change in zero-dimensional Betti number b0 that has occurred in accordance with a change in binarization reference value in binarized images, which have been generated for regions of a lung field without a nodule and a pulmonary vessel. In FIG. 14, the zero-dimensional Betti number b0 for the target region image of a lung field without a nodule is indicated by the solid line, and the zero-dimensional Betti number b0 for the target region image of a pulmonary vessel is indicated by the dashed line.

Figure 15:
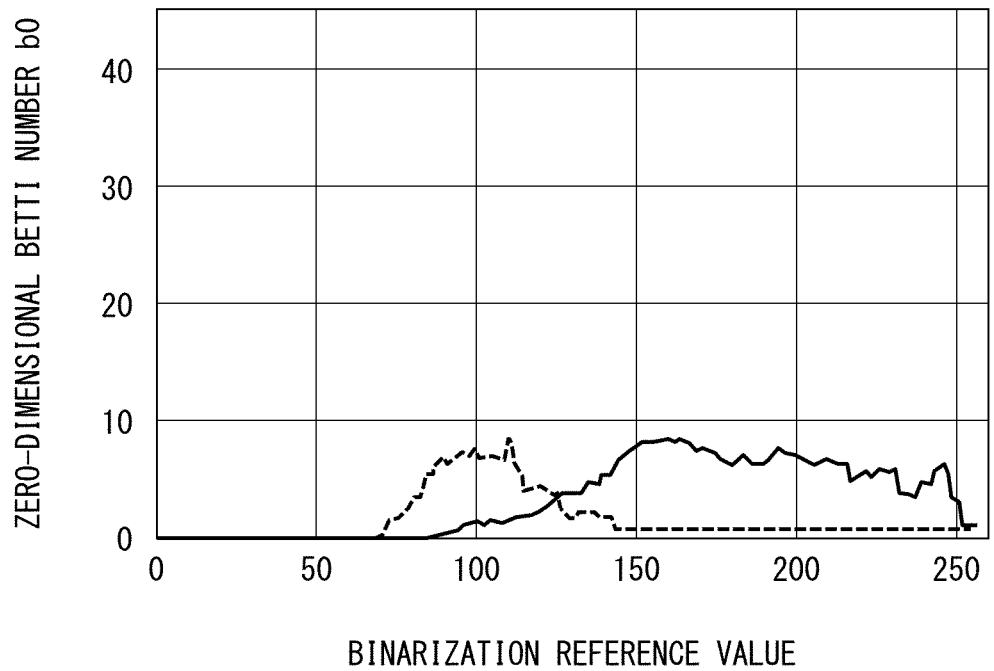
FIG. 15 is a graph obtained by plotting a change in zero-dimensional Betti number that has occurred in accordance with a change in binarization reference value in binarized images, which have been generated for a region of a solid nodule and a region of a ground-glass nodule.
Figures 16, 17:
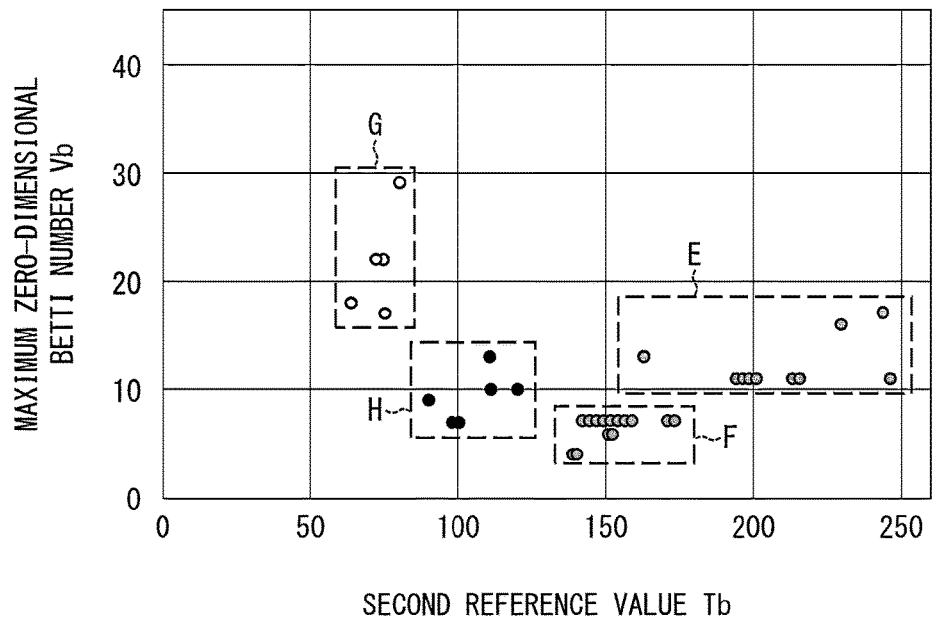
FIG. 16 is a graph obtained by plotting, for each target region image, a second reference value and a maximum zero-dimensional Betti number.
FIG. 17 is a diagram illustrating another example of a determination criterion.

Meanwhile, FIG. 15 is a graph obtained by plotting a change in zero-dimensional Betti number b0 that has occurred in accordance with a change in binarization reference value in binarized images, which have been generated for a region of a solid nodule and a target region image of a ground-glass nodule. In FIG. 10, the zero-dimensional Betti number b0 for the target region image of a solid nodule is indicated by the solid line, and the zero-dimensional Betti number b0 for the target region image of a ground-glass nodule is indicated by the dashed line.

Returning to FIG. 13, the reference value specifying section 43 specifies a binarized image in which the one-dimensional Betti number b1 is maximized, and a binarized image in which the zero-dimensional Betti number b0 is maximized. Then, the reference value specifying section 43 specifies, for the specified binarized image, a first reference value Ta, a maximum one-dimensional Betti number Va, a second reference value Tb, and a maximum zero-dimensional Betti number Vb (step S14: reference value specifying step).

Subsequently, the determining section 44 determines a change that has occurred in a lung, based on the first reference value Ta, the maximum one-dimensional Betti number Va, the second reference value Tb, and the maximum zero-dimensional Betti number Vb (step S15: determining step).

FIG. 16 is a graph obtained by plotting, for each target region image, a second reference value Tb and a maximum zero-dimensional Betti number Vb. As illustrated in FIG. 16, combinations of the second reference value Tb and the maximum zero-dimensional Betti number Vb which have been specified by the reference value specifying section 43 are clearly classified into four groups, i.e., groups E through H. Specifically, the group E is points at which the second reference value Tb and the maximum zero-dimensional Betti number Vb are plotted for a target region image of a solid nodule. The group F is points at which the second reference value Tb and the maximum zero-dimensional Betti number Vb are plotted for a target region image of a pulmonary vessel. The group G is points at which the second reference value Tb and the maximum zero-dimensional Betti number Vb are plotted for a target region image of a lung field without a nodule. The group H is points at which the second reference value Tb and the maximum zero-dimensional Betti number Vb are plotted for a target region image of a ground-glass nodule. Thus, based on the second reference value Tb and the maximum zero-dimensional Betti number Vb, it is possible to determine which one of a lung field without a nodule, a pulmonary vessel, a solid nodule, and a ground-glass nodule is indicated in the captured target region image. As compared with the graph obtained by plotting the first reference value Ta and the maximum one-dimensional Betti number Va for each target region image in FIG. 11, the groups E through H are closer to each other. Therefore, it is preferable that the determining section 44 utilizes the second reference value Tb and the maximum zero-dimensional Betti number Vb in addition to the first reference value Ta and the maximum one-dimensional Betti number Va which have been specified for the target region image. With this configuration, the image analyzing device 1 can further improve the accuracy of determination of a change that has occurred in a lung.

FIG. 17 is a diagram illustrating another example of the determination criterion 32. The determining section 44 determines, for each target region image, a change that has occurred in a lung, with reference to the first reference value Ta, the maximum one-dimensional Betti number Va, the second reference value Tb, and the maximum zero-dimensional Betti number Vb which are defined in the determination criterion 32.

(Variation)

It is possible to determine a change that has occurred in a lung, using also a ratio between the one-dimensional Betti number b1 and the zero-dimensional Betti number b0 which have been calculated by the Betti number calculating section 42. The following description will discuss an example in which the ratio between the one-dimensional Betti number b1 and the zero-dimensional Betti number b0 is a value (b1/b0) obtained by dividing the one-dimensional Betti number b1 by the zero-dimensional Betti number b0.

[Betti Number Calculating Section 42]

The Betti number calculating section 42 calculates b1/b0 with use of the one-dimensional Betti number b1 and the zero-dimensional Betti number b0 which have been calculated with respect to each of the plurality of binarized images.

[Reference Value Specifying Section 43]

The reference value specifying section 43 specifies a binarized image in which the ratio b1/b0 is maximized from among the plurality of binarized images generated by the binarizing section 41. Then, the reference value specifying section 43 specifies a third reference value Tc and a maximum value R of b1/b0. Here, the third reference value is a binarization reference value in the specified binarized image.

Note that the reference value specifying section 43 can generate a graph obtained by plotting a change in value of b1/b0 which is caused in accordance with a change in binarization reference value. The reference value specifying section 43 can read, from the generated graph, the third reference value Tc, the maximum value R of b1/b0, and the like.

[Determining Section 44]

The determining section 44 determines, based on at least two of (1) through (6) below, a change that has occurred in a lung.

(1) First reference value Ta
(2) Maximum one-dimensional Betti number Va
(3) Second reference value Tb
(4) Maximum zero-dimensional Betti number Vb
(5) Third reference value Tc
(6) Maximum value R of b1/b0

The third reference value Tc and the maximum value R of b1/b0 in target region images of a lung field without a nodule and a pulmonary vessel respectively differ greatly from the third reference value Tc and the maximum value R of b1/b0 in target region images of various pulmonary nodules. In view of this, the determining section 44 can use the third reference value Tc and the maximum value R of b1/b0 in the target region image to determine whether or not a change has occurred in a lung. Specifically, based on the third reference value Tc and the maximum value R of b1/b0 in a target region image, the determining section 44 can eliminate images corresponding to a lung field without a nodule and a pulmonary vessel from target region images.

Embodiment 3

The following description will discuss another embodiment of the present invention. Note that, for convenience, members which have functions identical to those of the members described in Embodiments 1 and 2 are given respective identical reference numerals, and the descriptions of such members will not be repeated.

Values of the one-dimensional Betti number b1 and the zero-dimensional Betti number b0 calculated for each target region image depend on an area of a region imaged in that target region image. In a case where areas of regions imaged for respective target region images vary, each of the one-dimensional Betti number b1, the zero-dimensional Betti number b0, and the like is preferably calculated as a value per unit area. Hereinafter, an area of a region imaged in a target region image is sometimes referred to as "W". In addition, a one-dimensional Betti number per unit area is sometimes referred to as "b1/W" and a zero-dimensional Betti number per unit area is sometimes referred to as "b0/W".

(Configuration of Image Analyzing Device 1*a*)

Figure 18:
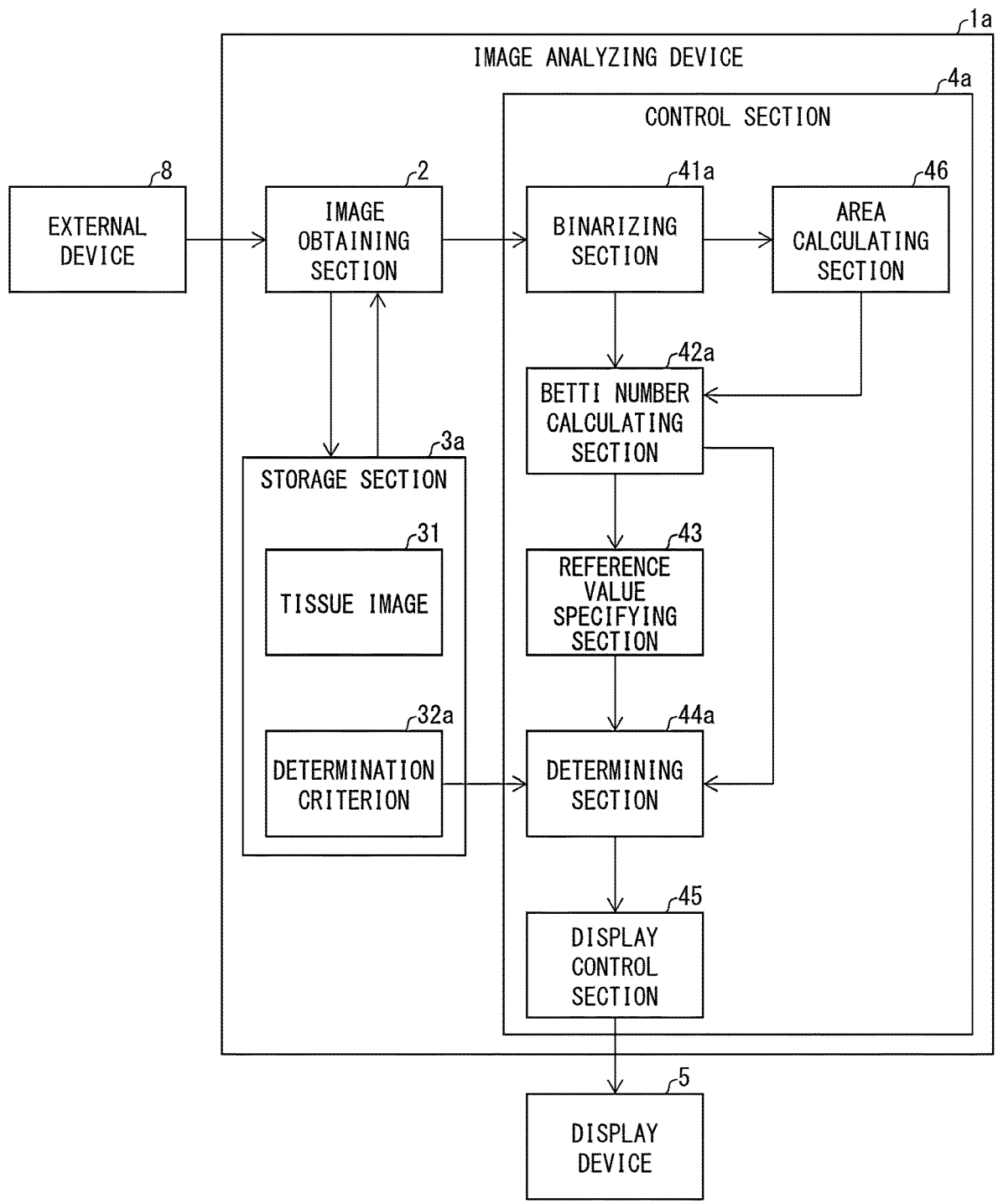
FIG. 18 is a functional block diagram illustrating a configuration example of an image analyzing device in accordance with another aspect of the present invention.

The following description will discuss, with reference to FIG. 18, a configuration of an image analyzing device 1*a* in accordance with an aspect of the present invention. FIG. 18 is a block diagram illustrating a configuration example of the image analyzing device 1*a* in accordance with an aspect of the present invention. In FIG. 18, as with FIG. 1, an external device 8 for transmitting an image to the image analyzing device 1*a* is also illustrated.

As illustrated in FIG. 18, the image analyzing device 1*a* includes an image obtaining section 2, a storage section 3*a*, and a control section 4*a*. The storage section 3*a* stores therein at least a tissue image 31 and a determination criterion 32*a*.

The image analyzing device 1*a* is different from the target region image 1 illustrated in FIG. 1 in that the image analyzing device 1*a* has a function to calculate an area of a region imaged in a target region image.

[Binarizing Section 41a]

The binarizing section 41a extracts a target region image to be analyzed from a lung CT image, carries out a binarization process with respect to the target region image, and generates a plurality of binarized images having respective binarization reference values different from each other (see FIG. 7).

[Area Calculating Section 46]

The area calculating section 46 obtains the target region image from the binarizing section 41a, and calculates an area W of a region imaged in the target region image. The area calculating section 46 calculates the area W in each of target region images in which imaged regions have different sizes, in order to compare, as values per unit area, the one-dimensional Betti number b1, the zero-dimensional Betti number b0, and the like which have been calculated for each of such target region images.

A value calculated by the area calculating section 46 is not limited to the area W, provided that the value can be used to calculate (i) a value representing the one-dimensional Betti number b1/W per unit area in each target region image and (ii) a value representing the zero-dimensional Betti number b0/W per unit area in each target region image. For example, in a case where an imaged region in a target region image has a square or rectangular shape, the area calculating section 46 can calculate a diagonal length of the imaged region, instead of the area W. For example, in a case where an imaged region in a target region image has a circular shape, the area calculating section 46 can calculate a radius or a diameter of the imaged region, instead of the area W.

In a case where a target region image extracted from a lung CT image has not been processed to be enlarged or reduced, the area calculating section 46 can calculate the number of pixels constituting the target region image, instead of an area of the target region image.

[Betti Number Calculating Section 42a]

The Betti number calculating section 42a calculates the one-dimensional Betti number b1/W per unit area and the zero-dimensional Betti number b0/W per unit area, based on the one-dimensional Betti number b1 and the zero-dimensional Betti number b0 which have been calculated for each target region image and on the area W of that target region image which has been obtained from the area calculating section 46.

With this configuration, the Betti number calculating section 42a can calculate the one-dimensional Betti number b1/W per and unit area and the zero-dimensional Betti number b0/W per unit area in a target region image in which a region having an arbitrary size is imaged.

[Determining Section 44a]

The determining section 44a determines, based on at least two of (1) through (6) below, a change that has occurred in a lung. Hereinafter, a binarization reference value in a binarized image in which the one-dimensional Betti number b1/W per unit area is maximized is referred to as "first reference value Ta". Similarly, a binarization reference value in a binarized image in which the zero-dimensional Betti number b0/W per unit area is maximized is referred to as "second reference value Tb".

(1) First reference value Ta
(2) Maximum value of one-dimensional Betti number b1/W per unit area (maximum one-dimensional Betti number Va)
(3) Second reference value Tb
(4) Maximum value of zero-dimensional Betti number b0/W per unit area (maximum zero-dimensional Betti number Vb)
(5) Third reference value Tc
(6) Maximum value R of b1/b0

The determining section 44a can determine whether or not a change has occurred in a lung, based only on the third reference value Tc and the maximum value R of b1/b0 which have been calculated by the Betti number calculating section 42a.

(Flow of Process Carried Out by Image Analyzing Device 1)

Figure 19:
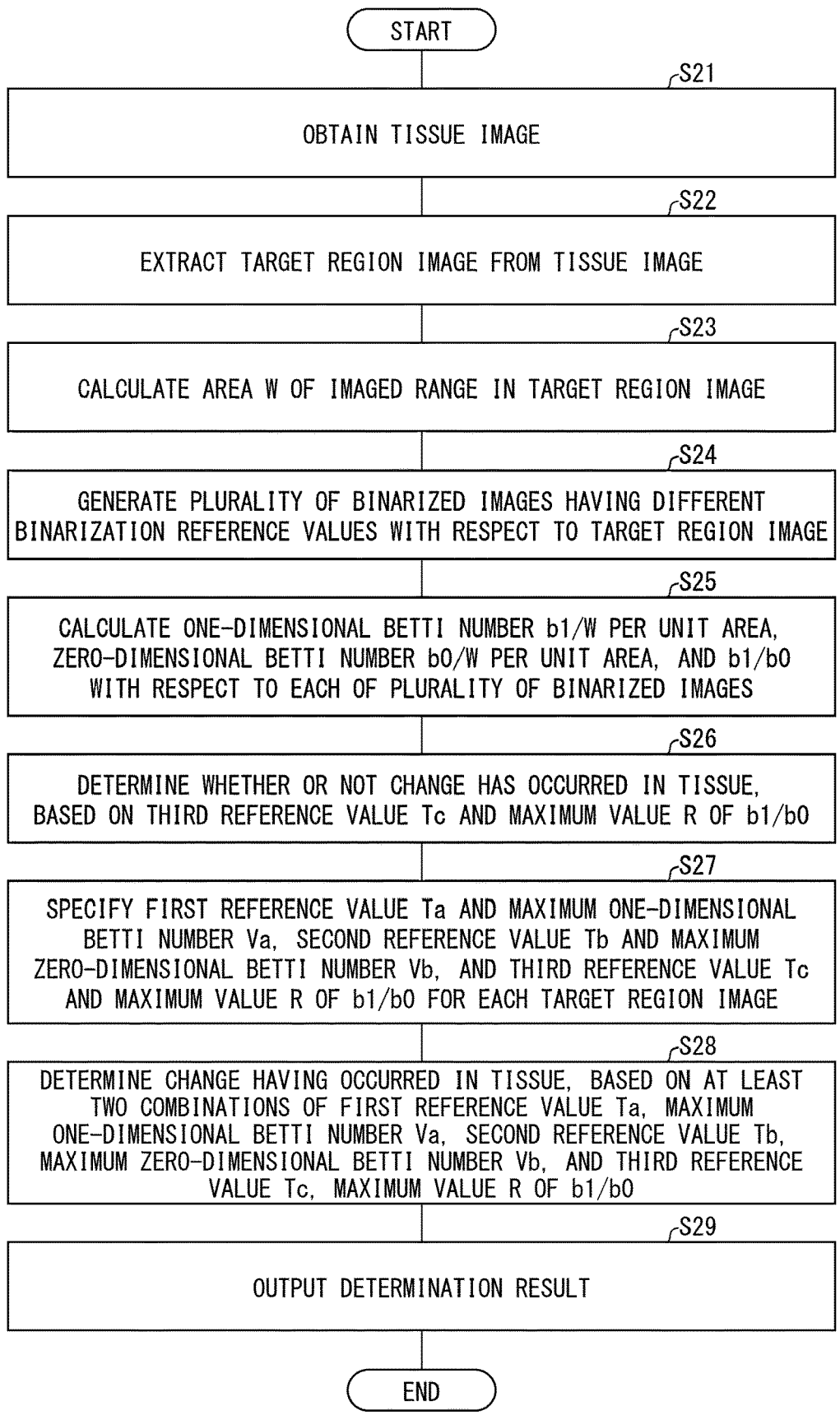
FIG. 19 is a flowchart illustrating an example of a flow of a process carried out by an image analyzing device in accordance with another aspect of the present invention.

The flow of the process carried out by the image analyzing device 1a will be described using FIG. 19, with reference to FIGS. 20 through 26 as appropriate. FIG. 19 is a flowchart illustrating an example of a flow of a process carried out by the image analyzing device 1a.

First, the image obtaining section 2 obtains, from the external device 8, a tissue image obtained by imaging a tissue (step S21).

Next, the binarizing section 41a extracts a target region image from the tissue image (step S22).

Next, the area calculating section 46 calculates the area W of an imaged range in the target region image which has been extracted by the binarizing section 41a (step S23: area calculating step).

Meanwhile, the binarizing section 41a generates, with respect to the target region image extracted in the step S22, a plurality of binarized images having respective binarization reference values different from each other (step S24: binarizing step). The graphs illustrated in FIGS. 20 through 25 are each depicted using a binarized image which has been prepared as a result of the binarization process that has been carried out by the binarizing section 41 with respect to a target region image in which CT values in the range of −1000 HU to 1000 HU are associated with pixel values in the range of 0 to 255. Therefore, values of the first reference value and the second reference value in the graphs illustrated in FIGS. 20 through 25 differ from those in FIGS. 9 through 11 and FIGS. 14 through 16.

Next, the Betti number calculating section 42a calculates, for each of the plurality of binarized images, the one-dimensional Betti number b1/W per unit area, b0/W per unit area, and b1/b0 (step S25: feature number calculating step).

The determining section 44a determines, based on the third reference value Tc and the maximum value R of b1/b0, whether or not a change has occurred in a lung (step S26: determining step). When determining whether or not a change has occurred in a lung, the determining section 44a does not use the first reference value Ta, the second reference value Tb, and the like. In view of this, as illustrated in FIG. 19, the determining section 44a can be configured to determine first whether or not a change has occurred in a lung. In a case where such a configuration is employed, the reference value specifying section 43 only needs to specify the first reference value Ta, the second reference value Tb, and the like only for a target region image which has been determined in the subsequent step S27 to indicate a change that has occurred in a lung. As a result, the image analyzing device 1a can more efficiently carry out the process of determining a change that has occurred in a lung.

Figure 20:
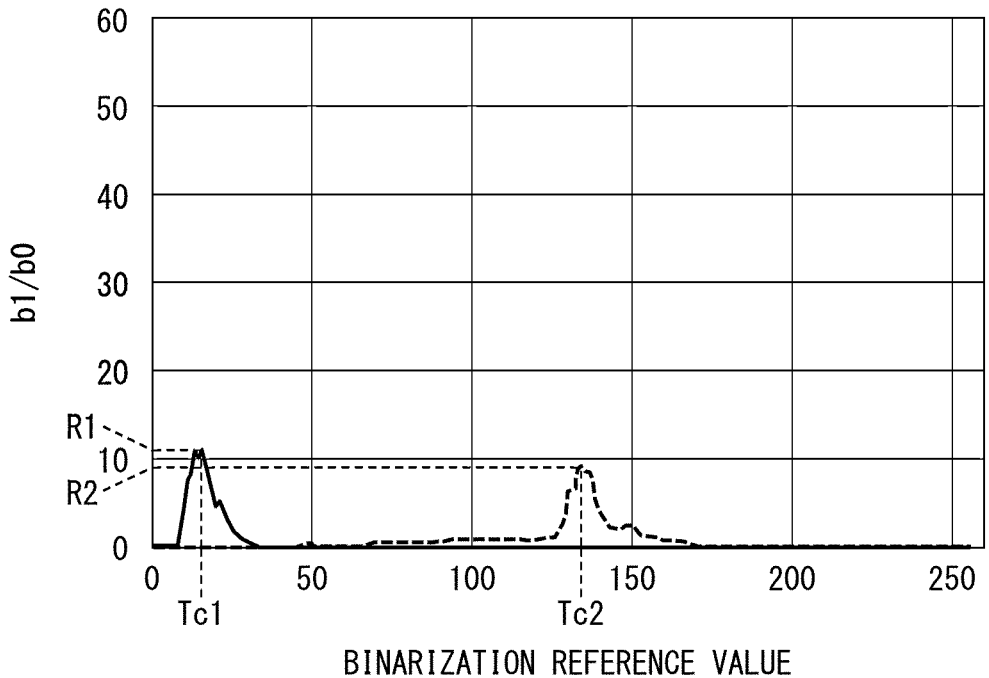
FIG. 20 is a graph obtained by plotting a change in ratio between a one-dimensional Betti number and a zero-dimensional Betti number that has occurred in accordance with a change in binarization reference value in binarized images, which have been generated for regions of a lung field without a nodule and a pulmonary vessel.

FIG. 20 is a graph obtained by plotting a change in b1/b0 that has occurred in accordance with a change in binarization reference value in binarized images, which have been generated for regions of a lung field without a nodule and a pulmonary vessel. In FIG. 20, b1/b0 for the target region image of a lung field without a nodule is indicated by the solid line, and b1/b0 for the target region image of a pulmonary vessel is indicated by the dashed line. FIG. 20 indicates a third reference value Tc1 and a maximum value R1 of b1/b0 for a target region image of a lung field without a nodule, and a third reference value Tc2 and a maximum value R2 of b1/b0 for a target region image of a pulmonary vessel.

Figure 21:
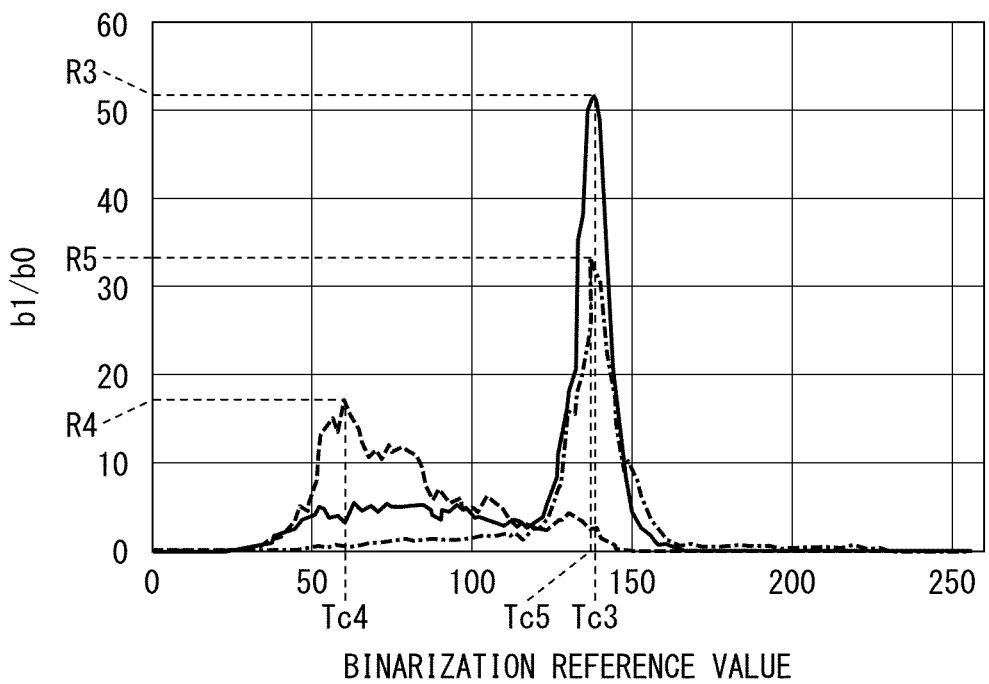
FIG. 21 is a graph obtained by plotting a change in ratio between a one-dimensional Betti number and a zero-dimensional Betti number that has occurred in accordance with a change in binarization reference value in binarized images, which have been generated for a region of a solid nodule and a region of a ground-glass nodule.

FIG. 21 is a graph obtained by plotting a change in b1/b0 that has occurred in accordance with a change in binarization reference value in binarized images, which have been generated with respect to a target region image in which a pulmonary nodule has occurred. In FIG. 21, b1/b0 for the target region image of a solid nodule is indicated by the dashed dotted line, and b1/b0 for the target region image of a ground-glass nodule is indicated by the dashed line. Moreover, b1/b0 for the target region image of a mixed nodule is indicated by the solid line. FIG. 21 indicates a third reference value Tc3 and a maximum value R3 of b1/b0 for a target region image of a mixed nodule, a third reference value Tc4 and a maximum value R4 of b1/b0 for a target region image of a ground-glass nodule, and a third reference value Tc5 and a maximum value R5 of b1/b0 for a target region image of a solid nodule.

The third reference value Tc1 for the target region image of a lung field without a nodule is smaller than the third reference values Tc2 through Tc5 for the other target region images. In addition, the maximum value R2 of b1/b0 for the target region image of a pulmonary vessel is smaller than the maximum values R3 through R5 of b1/b0 for the target region images of a pulmonary nodule, which are illustrated in FIG. 21. Therefore, the determining section 44a can determine the target region image of a lung field without a nodule, the target region image of a pulmonary vessel, and the target region image of a pulmonary nodule.

Returning to FIG. 19, the reference value specifying section 43 specifies, for each target region image, the first reference value Ta, the maximum one-dimensional Betti number Va, the second reference value Tb, the maximum zero-dimensional Betti number Vb, the third reference value Tc, and the maximum value R of b1/b0 (step S27: reference value specifying step).

Figure 22:
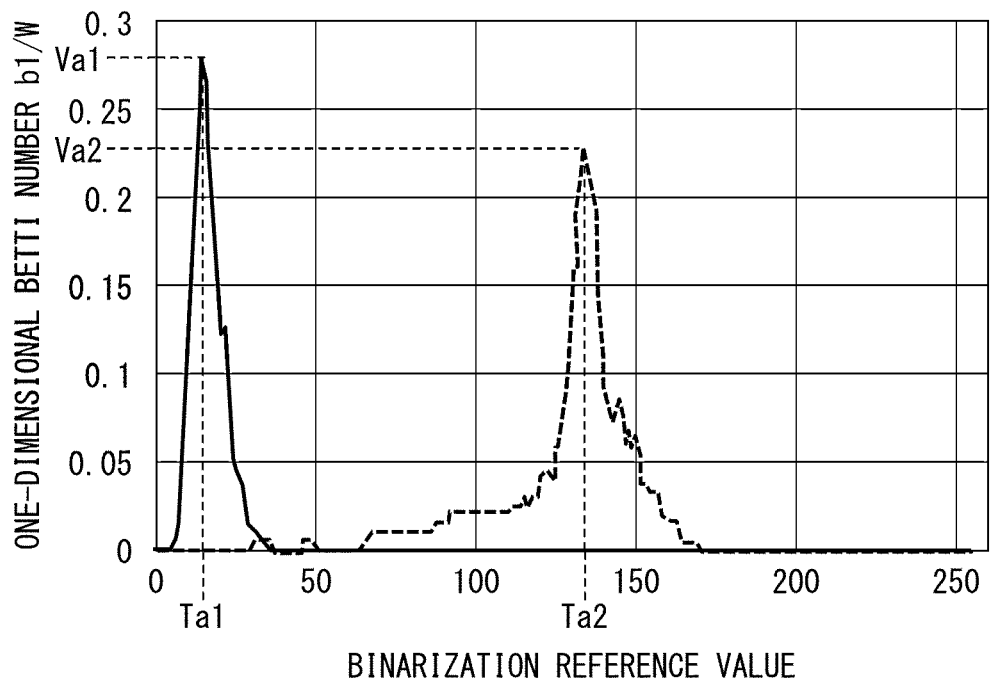
FIG. 22 is a graph obtained by plotting a change in one-dimensional Betti number that has occurred in accordance with a change in binarization reference value in binarized images, which have been generated for regions of a lung field without a nodule and a pulmonary vessel.

FIG. 22 is a graph obtained by plotting a change in one-dimensional Betti number b1/W per unit area that has occurred in accordance with a change in binarization reference value in binarized images, which have been generated for regions of a lung field without a nodule and a pulmonary vessel. In FIG. 22, the one-dimensional Betti number b1/W per unit area for the target region image of a lung field without a nodule is indicated by the solid line, and the one-dimensional Betti number b1/W per unit area for the target region image of a pulmonary vessel is indicated by the dashed line. FIG. 22 indicates a first reference value Ta1 and a maximum one-dimensional Betti number Va1 for a target region image of a lung field without a nodule, and a first reference value Ta2 and a maximum one-dimensional Betti number Va2 for a target region image of a pulmonary vessel.

Figure 23:
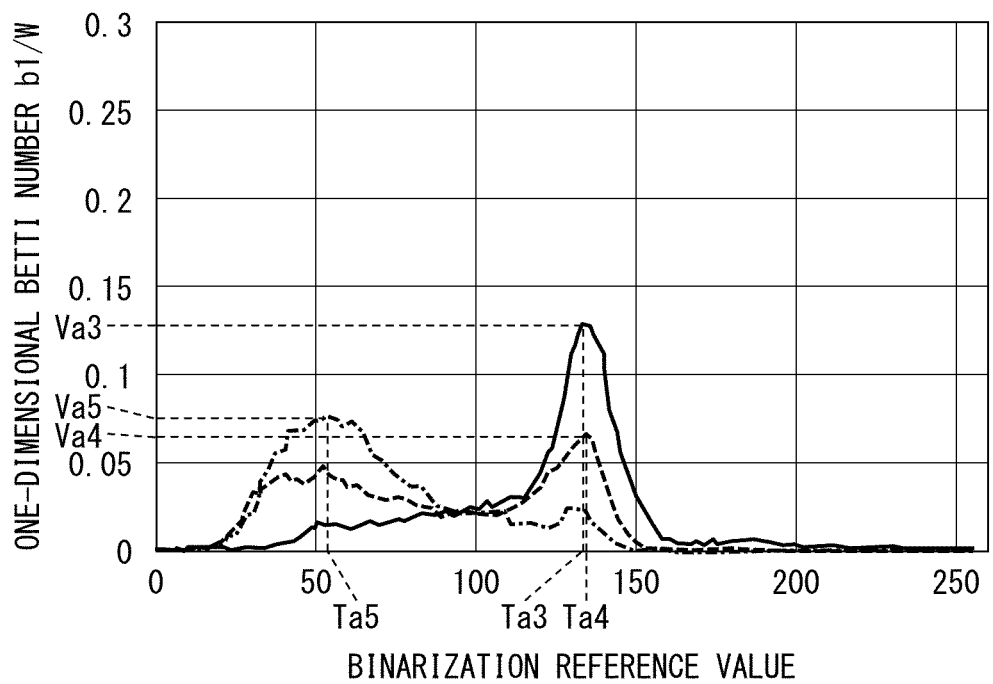
FIG. 23 is a graph obtained by plotting a change in one-dimensional Betti number that has occurred in accordance with a change in binarization reference value in binarized images, which have been generated for a region of a solid nodule and a region of a ground-glass nodule.

FIG. 23 is a graph obtained by plotting a change in one-dimensional Betti number b1/W per unit area that has occurred in accordance with a change in binarization reference value in binarized images, which have been generated with respect to a target region image in which a pulmonary nodule has occurred. In FIG. 23, the one-dimensional Betti number b1/W per unit area for the target region image of a solid nodule is indicated by the dashed dotted line, and the one-dimensional Betti number b1/W per unit area for the target region image of a ground-glass nodule is indicated by the dashed line. The one-dimensional Betti number b1/W per unit area for the target region image of a mixed nodule is indicated by the solid line. FIG. 23 indicates a first reference value Ta3 and a maximum one-dimensional Betti number Va3 for a target region image of a mixed nodule, a first reference value Ta4 and a maximum one-dimensional Betti number Va4 for a target region image of a ground-glass nodule, and a first reference value Ta5 and a maximum one-dimensional Betti number Va5 of a target region image of a solid nodule.

Figure 24:
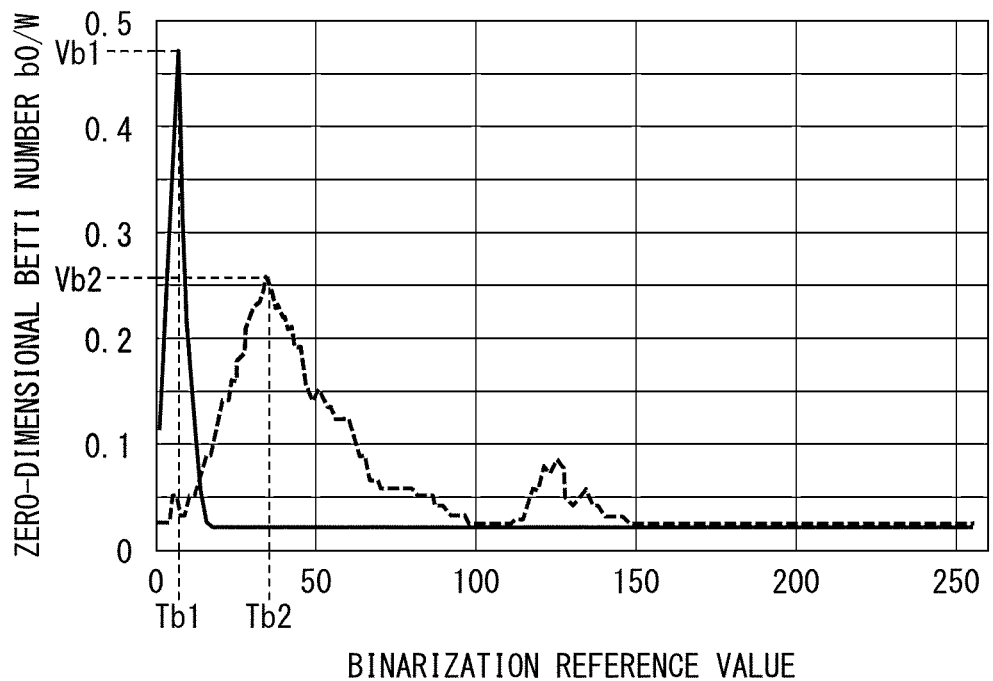
FIG. 24 is a graph obtained by plotting a change in zero-dimensional Betti number that has occurred in accordance with a change in binarization reference value in binarized images, which have been generated for regions of a lung field without a nodule and a pulmonary vessel.

FIG. 24 is a graph obtained by plotting a change in zero-dimensional Betti number b0/W per unit area that has occurred in accordance with a change in binarization reference value in binarized images, which have been generated for regions of a lung field without a nodule and a pulmonary vessel. In FIG. 24, the zero-dimensional Betti number b0/W per unit area for the target region image of a lung field without a nodule is indicated by the solid line, and the zero-dimensional Betti number b0/W per unit area for the target region image of a pulmonary vessel is indicated by the dashed line. FIG. 24 indicates a second reference value Tb1 and a maximum zero-dimensional Betti number Vb1 for a target region image of a lung field without a nodule, and a second reference value Tb2 and a maximum zero-dimensional Betti number Vb2 for a target region image of a pulmonary vessel.

Figure 25:
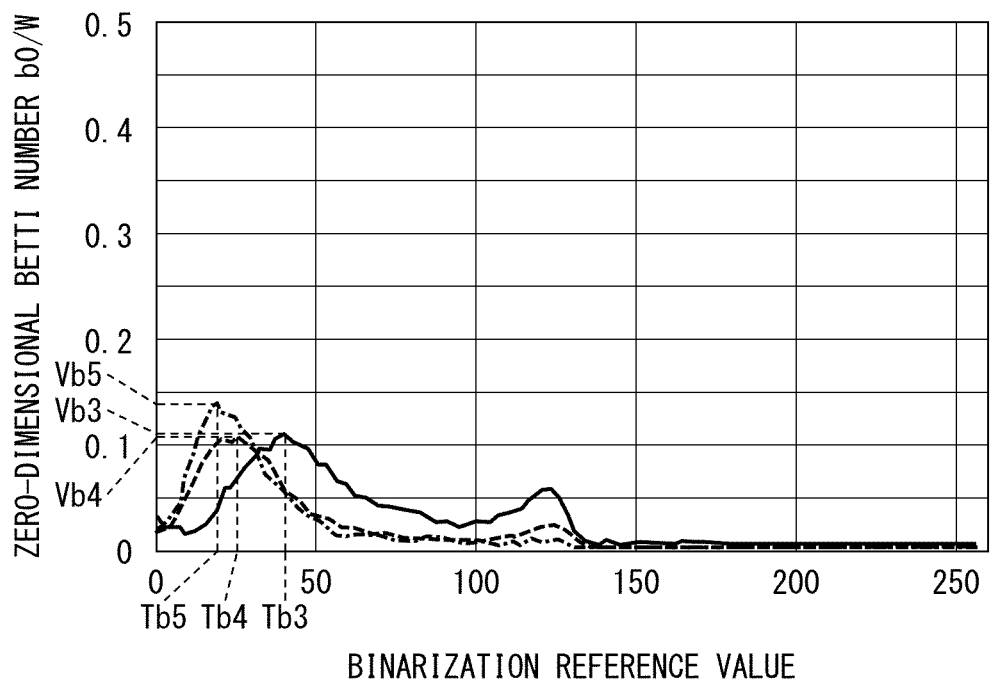
FIG. 25 is a graph obtained by plotting a change in zero-dimensional dimensional Betti number that has occurred in accordance with a change in binarization reference value in binarized images, which have been generated for a region of a solid nodule and a region of a ground-glass nodule.

FIG. 25 is a graph obtained by plotting a change in zero-dimensional Betti number b0/W per unit area that has occurred in accordance with a change in binarization reference value in binarized images, which have been generated for a target region image in which a pulmonary nodule has occurred. In FIG. 25, the zero-dimensional Betti number b0/W per unit area for the target region image of a solid nodule is indicated by the dashed dotted line, and the zero-dimensional Betti number b0/W per unit area for the target region image of a ground-glass nodule is indicated by the dashed line. The zero-dimensional Betti number b0/W per unit area for the target region image of a mixed nodule is indicated by the solid line. FIG. 25 indicates a second reference value Tb3 and a maximum zero-dimensional Betti number Vb3 for a target region image of a mixed nodule, a second reference value Tb4 and a maximum zero-dimensional Betti number Vb4 for a target region image of a ground-glass nodule, and a second reference value Tb5 and a maximum zero-dimensional Betti number Vb5 of a target region image of a solid nodule.

Returning to FIG. 19, the determining section 44 determines, based on at least two of (1) through (6) below, a change that has occurred in a lung (step S28: determining step).

(1) First reference value Ta
(2) Maximum one-dimensional Betti number Va
(3) Second reference value Tb
(4) Maximum zero-dimensional Betti number Vb
(5) Third reference value Tc
(6) Maximum value R of b1/b0

FIG. 26 is a diagram illustrating an example of the determination criterion 32a. The determining section 44 compares at least two of the above values (1) through (6) specified for the target region image with the values defined in the determination criterion 32a to determine a change that has occurred in a lung.

According to the configuration, the determining section 44 can determine in more detail a change that has occurred in a lung. For example, based on the maximum value R of b1/b0 and the maximum one-dimensional Betti number Va/W per unit area, the determining section 44 can distinguish between a solid nodule and a mixed nodule. Furthermore, for example, based on the maximum value R of b1/b0 and the first reference value Ta, the determining section 44 can distinguish between a ground-glass nodule and a mixed nodule.

The display control section 45 outputs a result of determination to the display device 5 (step S29).

Embodiment 4

The following description will discuss another embodiment of the present invention. Note that, for convenience, members which have functions identical to those of the members described in Embodiments 1 through 3 are given respective identical reference numerals, and the descriptions of such members will not be repeated.

(Configuration of Image Analyzing Device 1b)

Figure 27:
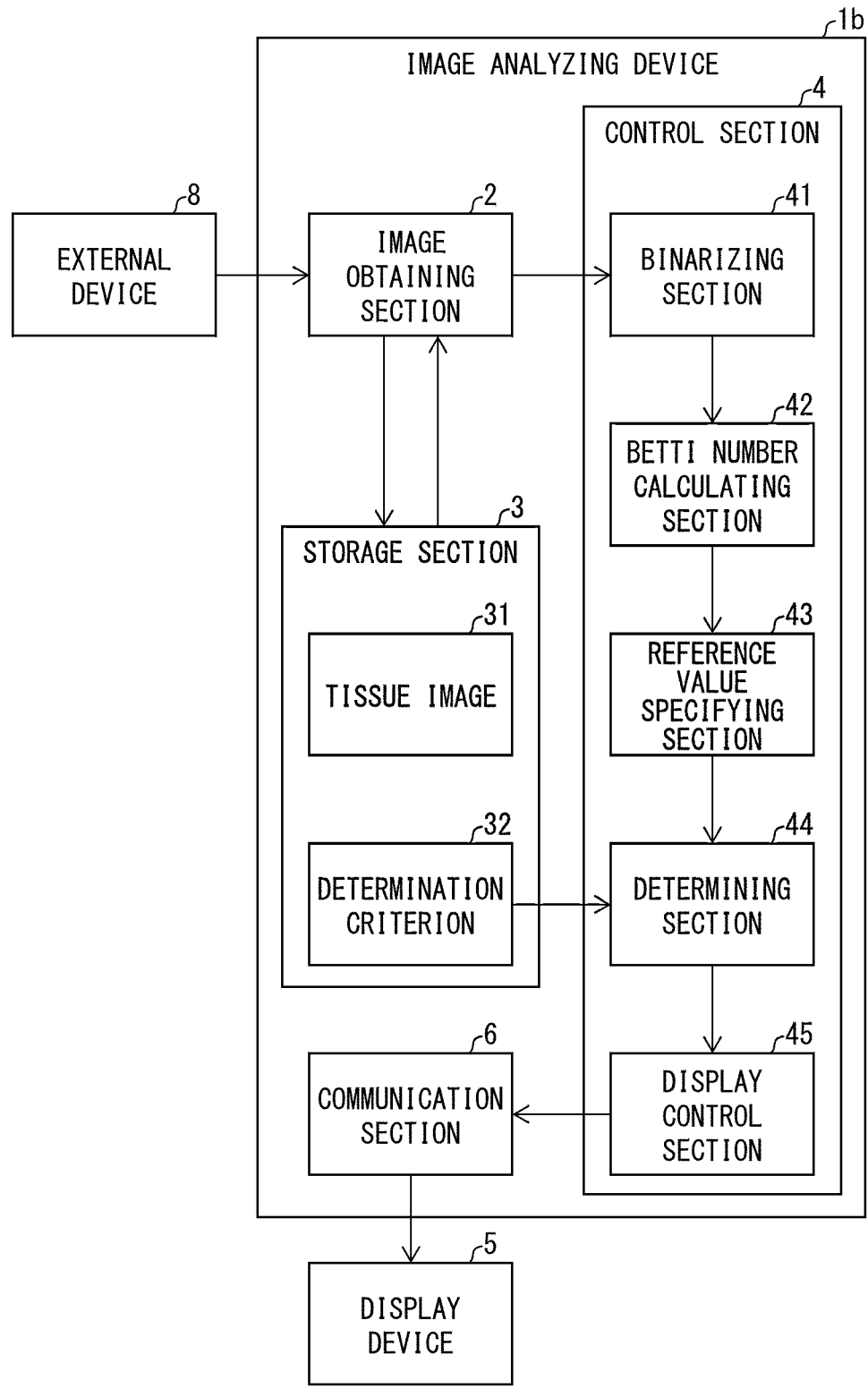
FIG. 27 is a functional block diagram illustrating a configuration example of an image analyzing device.

Next, a configuration of an image analyzing device 1b will be described below with reference to FIG. 27. FIG. 27 is a block diagram illustrating a configuration example of the image analyzing device 1b in accordance with Example 4 of the present invention. The image analyzing device 1b differs from the image analyzing device 1 illustrated in FIG. 1 in that the image analyzing device 1b includes a communication section 6. The communication unit 6 (i) obtains, from the display control section 45, display data for causing the display device 5 to display a determination result determined based on a result of analyzing a tissue image which is indicated by image data received from the external device 8, and (ii) transmits the display data to the display device 5.

Note that the image analyzing device 1b can include (i) a plurality of external devices 8 instead of a single external device 8 and (ii) a plurality of presenting devices 5 instead of a single presenting device 5.

The image analyzing device 1b is not limited to the configuration illustrated in FIG. 27. For example, the image analyzing device 1b can have a configuration obtained by adding the communication unit 6 to the image analyzing device 1a illustrated in FIG. 18.

(Image Analyzing System)

Figure 28:
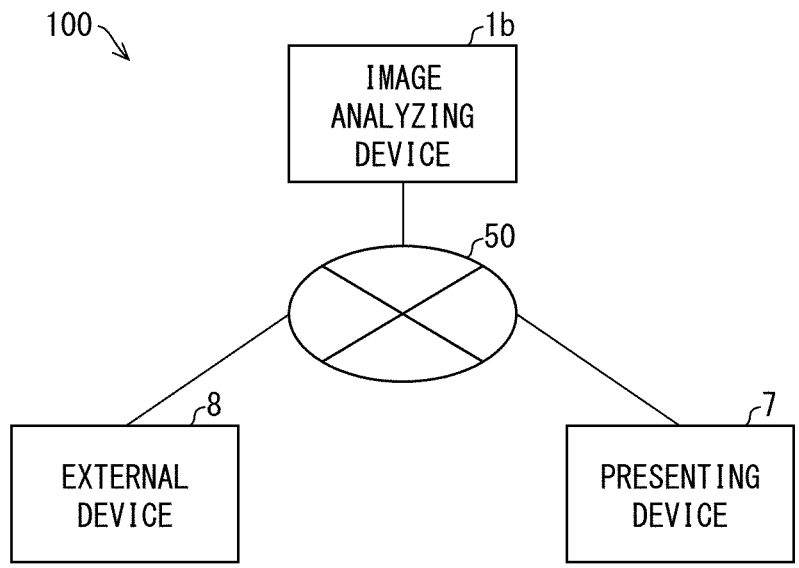
FIG. 28 is a diagram schematically illustrating a configuration example of an image analyzing system including an image analyzing device in accordance with the present invention.
Figure 29:
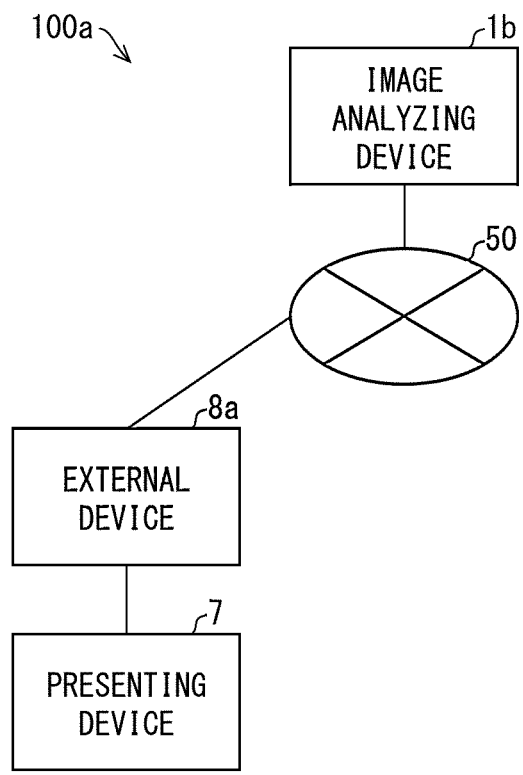
FIG. 29 is a diagram schematically illustrating another configuration example of an image analyzing system including an image analyzing device in accordance with the present invention.

Configuration examples of image analyzing systems 100 and 100a each of which includes the image analyzing device 1b will be described with reference to FIGS. 28 and 29. FIG. 28 is a diagram schematically illustrating a configuration example of the image analyzing system 100 which includes the image analyzing device 1b in accordance with an aspect of the present invention. FIG. 28 illustrates an example in which an external device 8 is provided in a place distant from a place in which a presenting device 7 is provided. FIG. 29 is a diagram schematically illustrating a configuration example of the image analyzing system 100a which includes the image analyzing device 1b in accordance with an aspect of the present invention. FIG. 29 illustrates an example in which a presenting device 7 is connected to an external device 8a.

As illustrated in FIG. 29, the image analyzing system 100 includes the external device 8, the image analyzing device 1b, and the presenting device 7. The external device 8, the image analyzing device 1b, and the presenting device 7 are each connected to an information communication network 50 such as the Internet. This allows the external device 8, the image analyzing device 1b, and the presenting device 7 to transmit/receive data to/from each other.

The external device 8 can be, for example, a personal computer connected to a CT device, or can be a server (such as an electronic medical record server or a CT image data server) for integrally managing images each obtained by capturing an image of a tissue.

The presenting device 7 is not limited to any particular one, provided that the presenting device 7 is a device which has a function of presenting, to a user, a result of an analysis of an image. The presenting device 7 is, for example, a display device which includes a display. Alternatively, the presenting device 7 can be communication terminal equipment, such as a tablet terminal which a medical expert brings with him/her.

Image data which indicates a captured tissue image is transmitted from the external device 8 to the image analyzing device 1b. The image analyzing device 1b that has received the image data (i) analyzes the image and (ii) transmits, via the communication section 6 to the presenting device 7, a determination result by the determining section 44.

The image analyzing system 100a includes the external device 8a, the image analyzing device 1b, and the presenting device 7. The external device 8a and the image analyzing device 1b are each connected to an information communication network 50 such as the Internet. This allows the external device 8a and the image analyzing device 1b to transmit/receive data to/from each other. The presenting device 7 is connected to the external device 8a.

That is, the image analyzing device 1b is capable of (i) receiving, from the external device 8 or 8a, an image captured at a distant place, (ii) analyzing the image, and then (iii) transmitting a result of determination by the determining section 44 to the presenting device 7. Note that it is possible to transmit, to the presenting device 7, the determination result that is associated with a tissue image that has been subjected to the analysis. The presenting device 7 can be a device that is connected to the external device 8a, or can be alternatively a device that is independent of each of the image analyzing device 1b and the external device 8.

The image analyzing systems 100 and 100a that are thus configured make it possible to (i) receive a tissue image from the respective external devices 8 and 8a, each of which is provided at a distant place, so as to analyze the image and (ii) present, to a user at a distant place, the tissue image and determined information. Thus, it is possible to provide a result of a highly accurate imaging diagnosis to a user at a distant place where no doctor is present or a shortage of doctors is occurring.

SOFTWARE IMPLEMENTATION EXAMPLE

A control block (particularly, the control section 4, 4a) of the image analyzing device 1, 1a, 1b can be realized by a logic circuit (hardware) provided in an integrated circuit (IC chip) or the like or can be alternatively realized by software.

In the latter case, the image analyzing device 1, 1a, 1b includes a computer which executes instructions of a program that is software realizing the foregoing functions. The computer includes, for example, at least one processor and a computer-readable recording medium storing the program. In a case where the processor in the computer reads out the program from the recording medium and executes the program, the object of the present invention is achieved. Examples of the processor encompass a central processing unit (CPU). Examples of the recording medium encompass a "non-transitory tangible medium" such as a read only memory (ROM), a tape, a disk, a card, a semiconductor memory, and a programmable logic circuit. The computer can further include a random access memory (RAM) or the like in which the program is loaded. Further, the program may be made available to the computer via any transmission medium (such as a communication network and a broadcast wave) which allows the program to be transmitted. Note that an aspect of the present invention can also be achieved in the form of a computer data signal in which the program is embodied via electronic transmission and which is embedded in a carrier wave.

ADDITIONAL REMARKS

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 1a, 1b: Image analyzing device
2: Image obtaining section
3, 3a: Storage section
7: Presenting device
8, 8a: External device
41, 41a: Binarizing section
42, 42a: Betti number calculating section (feature number calculating section)
43: Reference value specifying section
44, 44a: Determining section
46: Area calculating section
100, 100a: Image analyzing system
S2, S12, S24: Binarizing step
S3, S13, S25: Feature number calculating step
S4, S14, S27: Reference value specifying step
S5, S15, S26, S28: Determining step
S23: Area calculating step

The invention claimed is:

1. A method for analyzing a tissue image obtained by capturing an image of a tissue, said method comprising:
a binarizing step of extracting, from the tissue image, a target region image to be analyzed and generating, with respect to the target region image, a plurality of binarized images having respective binarization reference values different from each other;
a feature number calculating step of calculating, with respect to each of the plurality of binarized images, a feature number including a first feature number that indicates the number of hole-shaped regions, each of the hole-shaped regions being surrounded by pixels each having a first pixel value obtained by binarization, and each of the hole-shaped regions being constituted by pixels each having a second pixel value obtained by the binarization;
a reference value specifying step of specifying a binarized image in which the first feature number is maximized and specifying (i) a first reference value that indicates a binarization reference value in the binarized image which has been specified and (ii) a maximum first feature number that indicates the first feature number in the binarized image; and
a determining step of determining, based on the first reference value and the maximum first feature number, a change that has occurred in the tissue.

2. The method as set forth in claim 1, wherein:
in the feature number calculating step, a second feature number indicating the number of connected regions is further calculated with respect to each of the plurality of binarized images, each of the connected regions being constituted by connection of pixels each having the first pixel value;
in the reference value specifying step, a binarized image in which the second feature number is maximized is specified, and a second reference value indicating a binarization reference value in the binarized image which has been specified and a maximum second feature number indicating the second feature number in the binarized image are further specified; and
in the determining step, the change that has occurred in the tissue is determined based on the first reference value, the maximum first feature number, the second reference value, and the maximum second feature number.

3. The method as set forth in claim 2, further comprising an area calculating step of calculating an area of a region imaged in the target region image,
in the feature number calculating step, the first feature number per unit area and the second feature number per unit area being calculated with respect to each of the plurality of binarized images, and
in the reference value specifying step, a maximum value of the first feature number per unit area being specified as the first reference value, and a maximum value of the second feature number per unit area being specified as the second reference value.

4. The method as set forth in claim 2, wherein:
in the feature number calculating step, a ratio between the first feature number and the second feature number is calculated with respect to each of the plurality of binarized images;
in the reference value specifying step, a binarized image in which the ratio is maximized is specified, and a third reference value indicating a binarization reference value in the binarized image which has been specified and a maximum third feature number indicating the ratio between the first feature number and the second feature number in the binarized image are further specified; and
in the determining step, the change that has occurred in the tissue is determined based on at least two of the first reference value, the maximum first feature number, the second reference value, the maximum second feature number, the third reference value, and the maximum third feature number.

5. The method as set forth in claim 4, wherein:
in the determining step, whether or not a change has occurred in the tissue is determined based on the third reference value and the maximum third feature number.

6. An image analyzing device for analyzing a tissue image obtained by capturing an image of a tissue, said image analyzing device comprising:
a binarizing section that extracts, from the tissue image, a target region image to be analyzed and generates, with respect to the target region image, a plurality of binarized images having respective binarization reference values different from each other;
a feature number calculating section that calculates, with respect to each of the plurality of binarized images, a first feature number that indicates the number of hole-shaped regions, each of the hole-shaped regions being surrounded by pixels each having a first pixel value obtained by binarization, and each of the hole-shaped regions being constituted by pixels each having a second pixel value obtained by the binarization;
a reference value specifying section that specifies a binarized image in which the first feature number is maximized and specifies (i) a first reference value that indicates a binarization reference value in the binarized image which has been specified and (ii) a maximum first feature number that indicates the first feature number in the binarized image; and a determining section that determines, based on the first reference value and the maximum first feature number, a change that has occurred in the tissue.

7. The image analyzing device as set forth in claim 6, wherein:

the feature number calculating section further calculates, with respect to each of the plurality of binarized images, a second feature number indicating the number of connected regions, each of the connected regions being constituted by connection of pixels each having the first pixel value;

the reference value specifying section specifies a binarized image in which the second feature number is maximized, and further specifies a second reference value indicating a binarization reference value in the binarized image which has been specified and a maximum second feature number indicating the second feature number in the binarized image; and the determining section determines, based on the first reference value, the maximum first feature number, the second reference value, and the maximum second feature number, the change that has occurred in the tissue.

8. The image analyzing device as set forth in claim 7, further comprising:

an area calculating section that calculates an area of a range captured in the target region image, the feature number calculating section calculating the first feature number per unit area and the second feature number per unit area with respect to each of the plurality of binarized images, and the reference value specifying section specifying a maximum value of the first feature number per unit area as the first reference value, and specifying a maximum value of the second feature number per unit area as the second reference value.

9. The image analyzing device as set forth in claim 7, wherein:

the feature number calculating section further calculates a ratio between the first feature number and the second feature number with respect to each of the plurality of binarized images;

the reference value specifying section specifies a binarized image in which the ratio is maximized, and further specifies a third reference value indicating a binarization reference value in the binarized image which has been specified and a maximum third feature number indicating a maximum value of the ratio between the first feature number and the second feature number in the binarized image; and the determining section determines, based on at least two of the first reference value, the maximum first feature number, the second reference value, the maximum second feature number, the third reference value, and the maximum third feature number, the change that has occurred in the tissue.

10. The image analyzing device as set forth in claim 9, wherein:

the determining section determines, based on the third reference value and the maximum third feature number, whether or not a change has occurred in the tissue.

11. An image analyzing system, comprising:

an image analyzing device recited in claim 6;

an external device that transmits, to the image analyzing device, image data indicative of at least one of the tissue image and the target region image; and a presenting device that obtains information determined by the image analyzing device and presents the information.

12. A computer-readable non-transitory recording medium in which an image analyzing program is stored for causing the computer to perform:

a binarizing step of extracting, from the tissue image, a target region image to be analyzed and generating, with respect to the target region image, a plurality of binarized images having respective binarization reference values different from each other;

a feature number calculating step of calculating, with respect to each of the plurality of binarized images, a feature number including a first feature number that indicates the number of hole-shaped regions, each of the hole-shaped regions being surrounded by pixels each having a first pixel value obtained by binarization, and each of the hole-shaped regions being constituted by pixels each having a second pixel value obtained by the binarization;

a reference value specifying step of specifying a binarized image in which the first feature number is maximized and specifying (i) a first reference value that indicates a binarization reference value in the binarized image which has been specified and (ii) a maximum first feature number that indicates the first feature number in the binarized image; and a determining step of determining, based on the first reference value and the maximum first feature number, a change that has occurred in the tissue.

* * * * *